United States Patent
Prashanth et al.

(10) Patent No.: US 11,956,145 B1
(45) Date of Patent: Apr. 9, 2024

(12) United States Patent

(54) METHOD AND APPARATUS TO RECOVER FLOW USING AN ERROR MESSAGE IN A TUNNEL-LESS SDWAN

(71) Applicant: Versa Networks, Inc., Santa Clara, CA (US)

(72) Inventors: Fidelis Prashanth, San Jose, CA (US); Jayakrishnan Iyer, Morgan Hill, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 18/236,759

(22) Filed: Aug. 22, 2023

Related U.S. Application Data

(60) Provisional application No. 63/476,316, filed on Dec. 20, 2022, provisional application No. 63/437,095, filed on Jan. 4, 2023.

(51) Int. Cl.
*H04L 45/28* (2022.01)
*H04L 9/40* (2022.01)
*H04L 43/0823* (2022.01)
*H04L 45/00* (2022.01)

(52) U.S. Cl.
CPC .......... *H04L 45/28* (2013.01); *H04L 43/0847* (2013.01); *H04L 45/566* (2013.01); *H04L 63/0428* (2013.01)

(58) Field of Classification Search
CPC ............................ H04L 45/28; H04L 43/0847
USPC ......................................................... 709/238
See application file for complete search history.

(56) References Cited

U.S. PATENT DOCUMENTS

2019/0268973 A1* 8/2019 Bull ...................... H04W 92/02
2021/0036888 A1* 2/2021 Vadde Makkalla ..........................
H04L 12/4633

* cited by examiner

*Primary Examiner* — Sibte H Bukhari
(74) *Attorney, Agent, or Firm* — LOZA & LOZA, LLP

(57) ABSTRACT

A flow identifier is described for packet sequences through a secure tunnel of an SD-WAN and an error message for recovering the flow. A method includes receiving a sequence of packets, facilitating a first secure tunnel between a first hub and a second hub, assigning a first flow identifier to the sequence of packets, encapsulating a first start packet, the wrapper including the first flow identifier, sending the encapsulated first start packet to the second hub through the first secure tunnel, receiving an error message from the second hub, the error message including the first flow identifier and an error code, facilitating a second secure tunnel, assigning a second flow identifier, encapsulating a second start packet, the wrapper including the second flow identifier, and sending the encapsulated second start packet through the second secure tunnel.

16 Claims, 12 Drawing Sheets

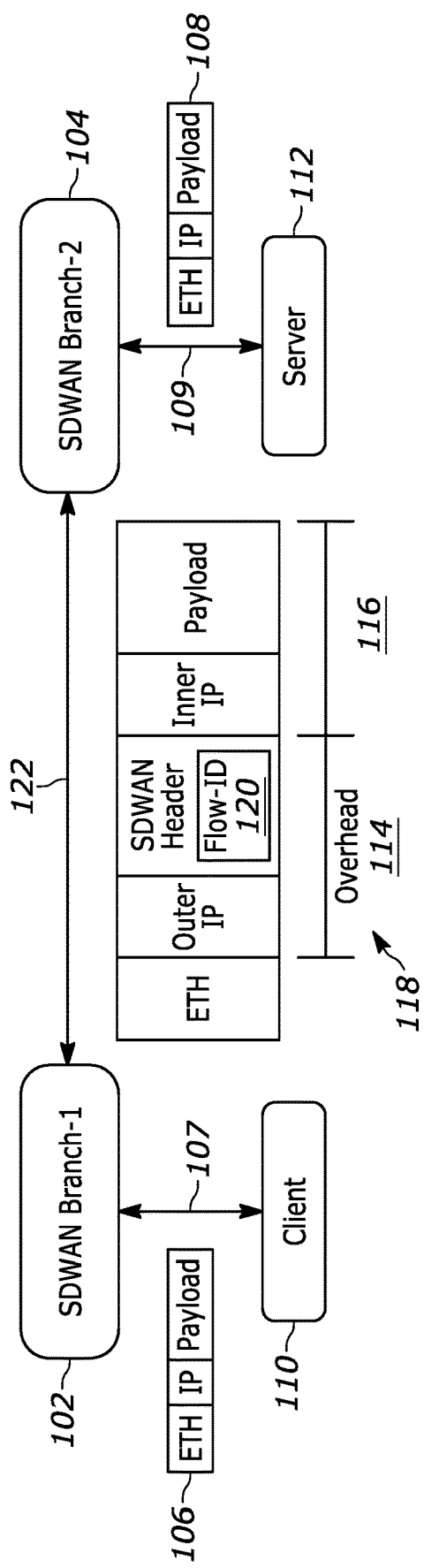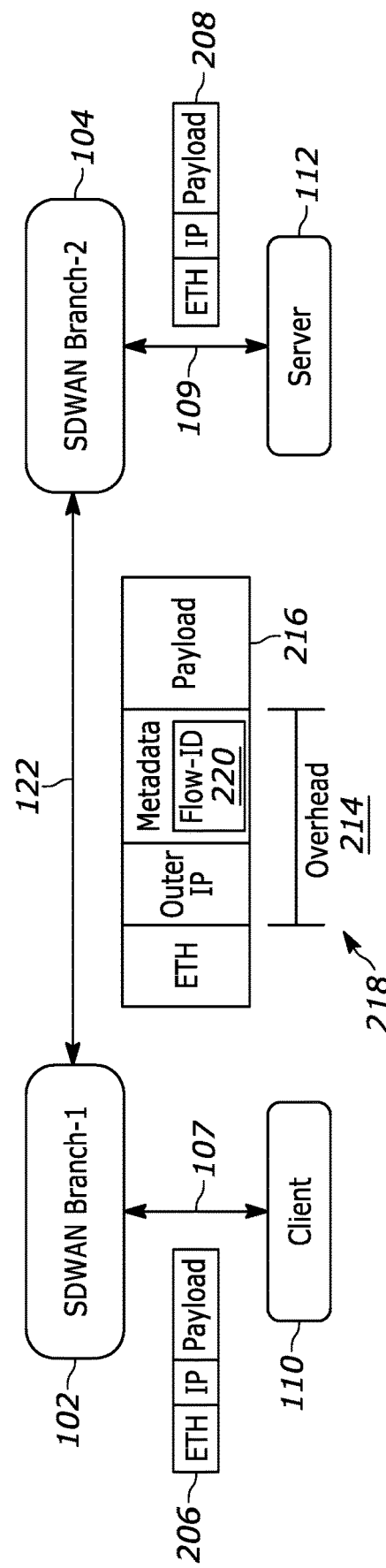

300

IPv4 Header :

400

TCP Header :

500

UDP Header :

600

IPv6 Header :

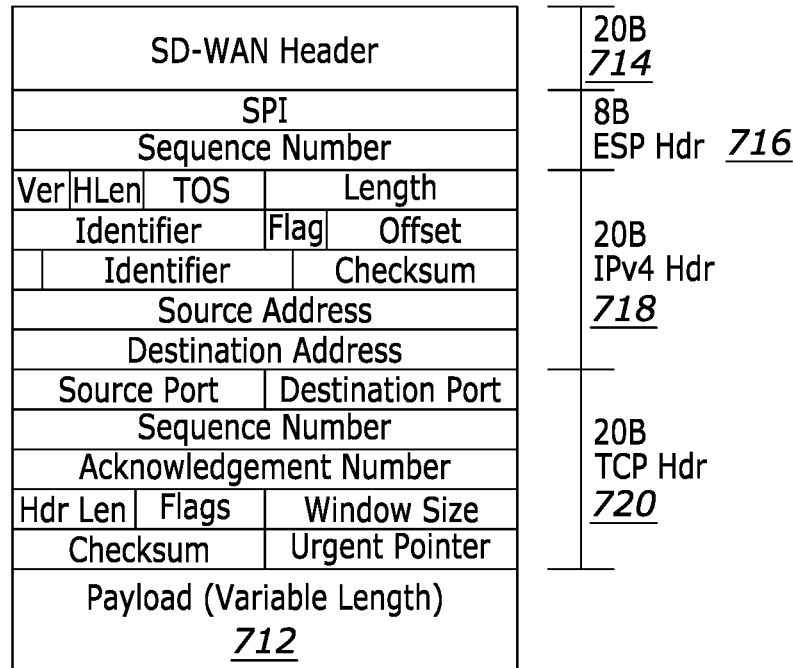
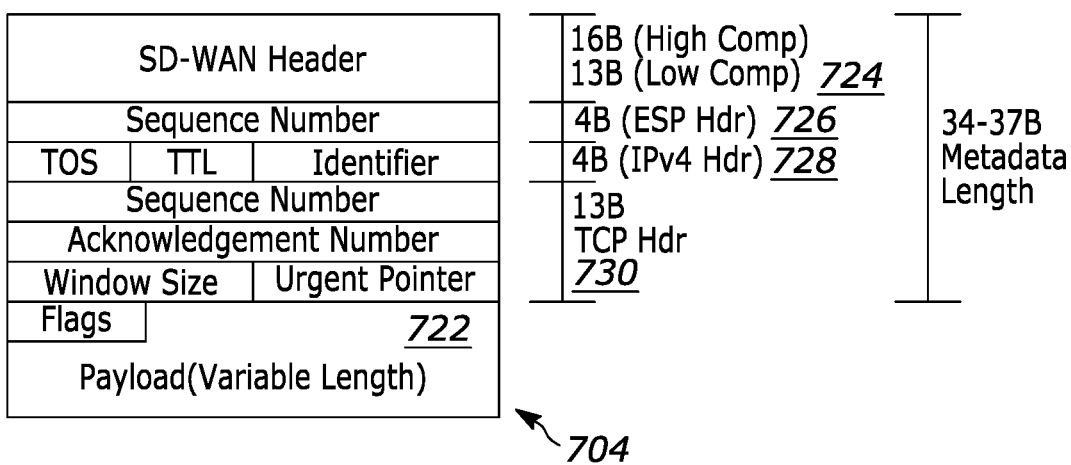
FIG. 7

METHOD AND APPARATUS TO RECOVER FLOW USING AN ERROR MESSAGE IN A TUNNEL-LESS SDWAN

CROSS-REFERENCE TO RELATED APPLICATIONS

The present application claims the priority of provisional patent application Ser. No. 63/476,316 filed Dec. 20, 2022 and provisional patent application Ser. No. 63/437,095 filed Jan. 4, 2023, both entitled METHOD AND SYSTEM FOR TUNNEL-LESS SDWAN, and having the same inventors and assignee as the present application. The disclosures of which are hereby incorporated by reference herein.

TECHNICAL FIELD

The description relates to secure tunnel packet communication and, more particularly, to a recovering a flow of packet sequences sent through such secure tunnel packet communication using a flow identifier.

BACKGROUND

An overlay environment allows edge nodes to route packets to other edge nodes through a wide area network (WAN). The overlay environment is built on top of an existing network infrastructure whether a public infrastructure like the Internet or a private network. A Software-Defined Wide Area Network (SD-WAN) can be used to provide secure connectivity between multiple branches over multiple different discrete network transports such as Multi-Protocol Label Switching (MPLS), broadband, Long Term Evolution (LTE), satellite links etc.

To improve security and simplify access, a hub, which may be an edge node, gateway, gateway server, gateway router, switch, or virtual private network (VPN) server, may be used between the client and a remote hub to a destination client, service, or server. The hub is typically a server that brokers data transactions through a secure tunnel. A variety of tunneling protocols are available for the connection between a pair of hubs. These protocols include an Internet Protocol Security (IPsec) protocol, a Transport Layer Security (TLS) protocol, and a Datagram Transport Layer Security (DTLS) protocol, among others.

With the tunnel, the packets between one hub and another hub are encrypted and encapsulated in a wrapper. A packet from a client becomes an inner packet that is encapsulated within an outer packet that is the wrapper. The wrapper is handled as its own packet sent from the sending hub to the receiving hub with its own 5-tuple and encrypted contents. A typical 5-tuple is a packet header that includes a source internet protocol (IP) address (src-ip or SIP), a destination internet protocol address (dst-ip or DIP), a protocol (proto), a source port (src-port) and a destination port (dst-port) and may be designated using the notation <src-ip, dst-ip, proto, src-port, dst-port>.

When a hub receives a packet from a local client to send through the tunnel, the packet will be addressed to another client, service, or server coupled to a second hub. The hub encapsulates the received packet as an inner packet within a wrapper and forwards the encapsulated packet to the second hub as appropriate based on the outer wrapper. Similarly, when a hub receives a packet through the tunnel, with an outer wrapper which is addressed to the hub, then the hub decapsulates the outer packet and forwards the inner packet to the appropriate client as indicated by the destination IP address of the inner packet. The hub may use a different tunnel or other security system to protect the contents of the inner decapsulated packet on the path to the client.

Network data communications may rely on virtualized resources to carry the data. A VNF (Virtual Network Function) may take the place of a hardware router. A Software-Defined Wide Area Network (SD-WAN) may take the place of a dedicated physical network. An SD-WAN may be configured to connect one or more end nodes, end users, and local area networks (LANs) to a branch. At least one designated hub is connected to each of the branches. The hubs are able to act as gateways to a plurality of branches. The branches themselves may have direct access to the Internet through one or more wide area network (WAN) links as well as through the hubs.

The disclosure of U.S. patent application Ser. No. 17/407,102, filed Aug. 19, 2021, entitled Path Selection for Data Traffic within a Software-Defined Wide Area Network using Traffic Metrics, is incorporated by reference herein in its entirety. A flow identifier is provided for packet sequences sent through secure tunnel packet communications between hubs in an SD-WAN. Embodiments herein disclose a method to route traffic through an SD-WAN between a first hub and a second hub

SUMMARY

Embodiments herein relate to a flow identifier provided for packet sequences sent through secure tunnel packet communications between hubs in an SD-WAN. Embodiments herein disclose a method to route traffic through an SD-WAN between a first hub and a second hub in a tunnel-less mode. A method includes receiving a sequence of packets from a first client at the first hub, the sequence of packets each having a same flow. A secure tunnel is facilitated between the first hub and the second hub. A first flow identifier is assigned to the sequence of packets of the flow. A first start packet of the sequence of packets is encapsulated in a wrapper. The wrapper includes the first flow identifier. The encapsulated first start packet of the sequence of packets is sent from the first hub to the second hub through the secure tunnel. The method further includes receiving an error message from the second hub, the error message including the first flow identifier and an error code, facilitating the secure tunnel again between the first hub and the second hub in response to receiving the error message, assigning a second flow identifier to the sequence of packets, encapsulating a second start packet of the sequence of packets in a wrapper, the wrapper including the second flow identifier, and sending the encapsulated second start packet of the sequence of packets from the first hub to the second hub through the secure tunnel.

In some embodiments, the error message is configured to indicate an error with a flow of the sequence of packets associated with the first flow identifier. In some embodiments, the error code is configured to indicate that a session associated with the secure tunnel has aged. In some embodiments, the error code is configured to indicate that the second hub has restarted. In some embodiments, the error code is configured to indicate that the second hub did not find the first flow identifier. In some embodiments, the error message is configured as an Internet Control Message Protocol (ICMP) message.

Some embodiments include associating fields of a header of the second start packet with the second flow identifier, removing the associated fields from a header of a third packet of the sequence of packets to form a reduced third packet, and encapsulating the reduced third packet in a wrapper that includes the second flow identifier; and sending the encapsulated reduced third packet of the sequence of packets from the first hub to the second hub through the secure tunnel, wherein sending the encapsulated second start packet comprises sending the encapsulated second start packet without removing fields from a header of the second start packet.

Some embodiments include converting fields of a header of a third packet of the sequence of packets to a header format that has fewer bytes to form a reduced third packet, encapsulating the reduced third packet in a wrapper that includes the second flow identifier, and sending the encapsulated reduced third packet from the first hub to the second hub through the secure tunnel.

In some embodiments, converting fields comprises converting the fields of the reduced third packet to a metadata supplement to the reduced third packet. In some embodiments, converting fields comprises removing the second start packet header and combining the second start packet header and the second flow identifier to form metadata attached to a payload of the reduced third packet before encapsulating the reduced third packet.

Some embodiments include converting fields of a header of a fourth packet of the sequence of packets to a header format that has fewer bytes to form a reduced fourth packet, encapsulating the reduced fourth packet in a wrapper that includes the second flow identifier, and sending the encapsulated reduced fourth packet of the sequence of packets from the first hub to the second hub through the secure tunnel.

In another example a non-transitory computer-readable storage medium contains program instructions, which when executed by the computer cause the computer to perform operations. The operations include receiving a sequence of packets from a first client at a first hub, the sequence of packets each having a same flow, facilitating a secure tunnel between the first hub and a second hub, assigning a first flow identifier to the sequence of packets having the flow, encapsulating a start packet of the sequence of packets in a wrapper, the wrapper including the first flow identifier, sending the encapsulated start packet of the sequence of packets from the first hub to the second hub through the secure tunnel, receiving an error message from the second hub, the error message including the first flow identifier and an error code, facilitating a second secure tunnel between the first hub and the second hub in response to receiving the error message, assigning a second flow identifier to the sequence of packets, encapsulating a second packet of the sequence of packets in a wrapper, the wrapper including the second flow identifier, and sending the encapsulated reduced packet of the sequence of packets from the first hub to the second hub through the second secure tunnel.

In some embodiments, the error message is configured to indicate an error with a flow of the sequence of packets associated with the first flow identifier. In some embodiments, the error code is configured to indicate that the second hub did not find the first flow identifier. In some embodiments, the error message is configured as an Internet Control Message Protocol (ICMP) message.

In some embodiments, the operations include associating fields of a header of the second start packet with the second flow identifier, removing the associated fields from a header of a third packet of the sequence of packets to form a reduced third packet, and encapsulating the reduced third packet in a wrapper that includes the second flow identifier, and sending the encapsulated reduced third packet of the sequence of packets from the first hub to the second hub through the secure tunnel, wherein sending the encapsulated second start packet comprises sending the encapsulated second start packet without removing fields from a header of the second start packet.

In another example, a network node includes a communications interface configured to receive a sequence of packets from a first client, the sequence of packets each having a same flow, a session management module configured to facilitate a secure tunnel between the network node and a hub and to assign a first flow identifier to the sequence of packets; and a processor configured to encapsulate a first start packet of the sequence of packets in a wrapper, the wrapper including the first flow identifier. The communications interface is further configured to send the encapsulated first start packet of the sequence of packets from the network node to the hub through the secure tunnel, and to receive an error message from the hub, the error message including the first flow identifier and an error code. The session management module further is configured to facilitate a secure tunnel between the network node and the hub in response to receiving the error message and to assign a second flow identifier to the sequence of packets. The processor is further configured to encapsulate a second start packet of the sequence of packets in a wrapper, the wrapper including the second flow identifier, and the communications interface is further configured to send the encapsulated second start packet of the sequence of packets from the network node to the hub through the secure tunnel.

In some embodiments, the processor is further configured to convert fields of a header of a third packet of the sequence of packets to a header format that has fewer bytes to form a reduced third packet and to encapsulate the reduced packet in a wrapper that includes the first flow identifier; and the communications interface is further configured to send the encapsulated reduced third packet from the network node to the hub through the secure tunnel, wherein sending the encapsulated second start packet comprises sending the encapsulated second start packet without removing fields from a header of the second start packet.

In some embodiments, converting fields comprises converting the fields of the reduced packet to a metadata supplement to the reduced packet. In some embodiments, the sequence of packets each having a same flow each have a same 5-tuple.

BRIEF DESCRIPTION OF THE FIGURES

The embodiments herein will be better understood from the following detailed description with reference to the drawing figures, in which:

FIG. 1 is a block diagram of a client in communication with a remote server through a secure tunnel with a flow identifier suitable for embodiments herein;

FIG. 2 is a block diagram of a client in communication with a remote server through a secure tunnel with a reduced inner packet suitable for embodiments herein;

FIG. 7 is a diagram of an IPv4 TCP header showing a start packet header and a reduced second packet header suitable for embodiments herein;

DETAILED DESCRIPTION OF EMBODIMENTS

Figure 3:
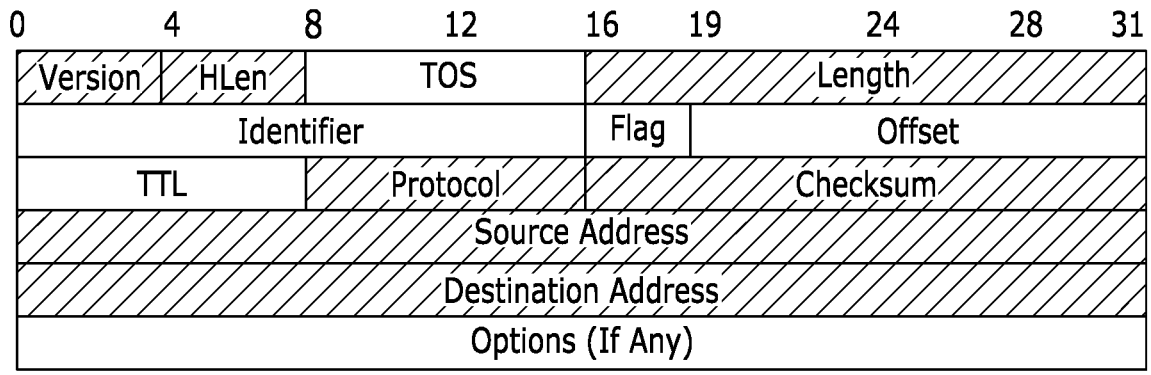
FIG. 3 is a diagram of an IPv4 header showing an example of a division into mutable and immutable fields suitable for embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein are described in the context of secure tunnels between two hubs. This may be in a Virtual Private Network (VPN) or in another context. The hubs may be in the form of gateways, edge nodes, VNFs and other related components. The VPN may connect through any of a variety of different data network environments with different physical or virtual structures. These structures include virtual networks such as a Software Defined Wide Area Network (SD-WAN or SDWAN) where there is at least one designated hub that operates as a node for each of one or more clients or a network of clients, such as on a local area network (LAN). However, embodiments disclosed herein can be applied in non-software-defined WANs and for applications hosted within the network, e.g., within a LAN (Local Area Network).

FIG. 1 and FIG. 2 show an example of an operation of a tunnel-less mode through an SD-WAN. Hubs on opposite sides of a tunnel through an SD-WAN use a flow identifier to label a sequence of packets in a flow. After initialization with a start packet of the sequence, the subsequent packets may be reduced in size using any of a variety of techniques. In some examples, immutable fields of the packet headers are removed. In some examples, the packet headers are compressed or encrypted. In some examples, the packet headers are converted to metadata and combined with other parts of the packet. These techniques may be combined in different way so that subsequent packets through the tunnel are reduced packets that are different from the start packet. By changing the packets away from the standard configuration of the start packet, the SD-WAN is said to be in a tunnel-less mode with respect to the subsequent packets.

FIG. 1 is a block diagram of a client 110 in communication with a remote server 112 through a first branch node 102 of an SD-WAN and a second branch node 104 of the SD-WAN. In this example, the first branch node 102 operates as a first hub and the second branch node 104 operates as a second hub in the SD-WAN. The client 110 is coupled to the remote server 112 to receive connections and services hosted by the remote server 112. The same principles apply for communication between two servers or two clients instead of a client and a server.

The first branch node 102 is coupled to the client 110 through a network 107 such as a wide area network (WAN), a metropolitan area network (MAN), or a local area network (LAN) which may be the Internet or an intranet. The client 110 and the first branch node 102 communication through the network 107 with packets in a form suitable for the protocols of the network 107. As shown, in some embodiments, a start packet 106 through the network 107 has a form of an Ethernet header, an IP header, e.g., a 5-tuple, and a payload. Similarly, the remote server 112 is coupled to the second branch node 104 through a network 109 of any suitable type to send and receive packets with the second branch node 104. The forwarded packet 108 to the server from the second branch node 104 may have a same or similar form as the start packet 106. As shown, the forwarded packet 108 has a same structure of Ethernet header, IP header, and payload as the start packet 106. However, this is not required. The client 110 and remote server 112 may be physical computing systems or virtualized resources in one or more distributed locations. For packets sent in the opposite direction, i.e., from the remote server 112 to the client 110, the packets will have the same form as the packets shown.

The client or the server or both may be a server, workstation, desktop computer, thin client, notebook computer, tablet, a point-of-sale device in any form, a mini-computer, a stick computer, cellular telephone, or any other communication device that connects to other networks through a wired or wireless network, for example Ethernet, Wi-Fi, or a cellular network. The client or the server may be physical or virtualized in any suitable way.

The first branch node 102 communicates packets between the client 110 and the second branch node 104. The client 110 may have one or more service applications to communicate with the remote servers 112, such as a web browser, email application, file transfer application, portal application, etc. The client 110 and the remote server 112 may also have a VPN application that is configured to configure and manage VPN sessions. The first branch node 102 communicates with the second branch node 104 using a secure tunnel 122, e.g., a VPN session or other secure session. The secure tunnel facilitates the use of a secure protocol for secure tunneling through what may be an insecure network. The techniques and structures described here may be used in a variety of different specific physical connections and IP protocols. Those described here are provided only as examples.

The first branch node 102 has a communications interface that enables data communications with authentication, secure tunnels, SLA metrics, route exchange, capability exchange, session establishment, etc. The capability exchange may be used to determine that the first branch node 102 and the second branch node 104 are able to communicate using a flow identifier and reduced packet header. The capability exchange may also be used to enable or disable the use of reduced packet headers or to select appropriate policies. The first branch node 102 may communicate with the second branch node 104 using any suitable secure tunneling protocol e.g., IPsec, TLS, or DTLS. A session may be established to secure credentials and protocols for the secure tunnel 122. Encapsulated packets 118 that are forwarded by the first branch node 102 or by the second branch node 104 are first encapsulated and then sent. The encapsulation places an inner packet 116 with an inner IP header and a payload within an outer wrapper 114 with an outer IP header and an SD-WAN header. For the start packet 106, the inner packet 116 is the same as the start packet 106 from the client 110 with the same IP header which is also the same as the forwarded packet 108 to the remote server 112. The outer IP header is added to the inner packet 116 to support the secure tunnel 122 and allows for the packet to be communicated between the first branch node 102 and the second branch node 104. In some examples, the inner packet 116 is compressed or encrypted or both to improve security through the secure tunnel.

The overlay and tunnel headers, including the outer IP header and the inner IP header, result in a significant overhead and eventually lead to a noticeable increase in the size of each packet. This has a negative impact not only on bandwidth usage through the network link, but it also affects the transmission delay and the customer's experience. This is a greater concern in low bandwidth links such as satellite links. In order to reduce the overhead, the inner headers may be optimized and even partially or fully eliminated from encapsulated packets that are passed through the network link.

The start packet 106 from the client 110 may be a start packet of a sequence of packets of a flow. For purposes of the present description, a flow refers to a communication channel between endpoints. In the example of FIG. 1, the endpoints are the client 110 and the remote server 112. In many examples, a flow is defined by its 5-tuple, a collection of five data points. However, this is not necessary in every implementation, e.g., the source and destination ports are not used in ICMP. In some examples, the protocol is not included in the packet headers because it is assumed or determined by a separate protocol. In addition, the path between the first branch node 102 and the second branch node 104 may change without affecting the flow that is between the two endpoints. Herein, a flow will generally be described as being defined by its 5-tuple, however, other flow definitions are also contemplated.

For the flow of FIG. 1, the client 110 is in communication with the remote server 112. This may be indicated by the 5-tuple from the client and the 5-tuple from the server, or in another way, so that each packet of the respective sequence of packets shares a same 5-tuple. The first branch node 102 may then assign a flow identifier to the sequence of packets from the client. The first branch node 102 may then include the flow identifier with the encapsulated packet 118 that is sent to the second branch node 104. The flow identifier may be used to identify the flow, that is the sequence of packets each having the 5-tuple. In some examples, the first branch node 102 includes the flow identifier 120 in the SD-WAN header of the outer wrapper 114. The flow identifier 120 identifies the sequence of packets but does not affect the addresses in the SD-WAN header so that intermediate nodes in the path from the first branch node 102 to the second branch node 104 are not affected by the flow identifier 120.

The second branch node 104 receives the flow identifier 120 and the intact start packet 106 as the inner packet 116 with the inner IP addresses and the payload of the encapsulated packet 118. The flow identifier 120 identifies the start packet 106 as a first packet in the sequence of packets. The second branch node parses the header (Inner IP) of the start packet 106 to route the forwarded packet 108 to the remote server 112. Upon reading the flow identifier 120, the second branch node also saves the parsed header of the start packet for use with the second and subsequent packets of the corresponding sequence of packets.

FIG. 2 is a block diagram of the same components sending a subsequent packet of the sequence of packets after the start packet from the same client to the same server. The client 110 in communication with the remote server 112 through the first branch node 102 of the SD-WAN and the second branch node 104 of the SD-WAN. The first branch node 102 operates as a first hub and the second branch node 104 operates as a second hub in the SD-WAN. The client 110 is coupled to the remote server 112 to receive connections and services hosted by the remote server 112. As in the example of FIG. 1, the client 110 may be replaced with a server. The remote server 112 may be replaced by a client such that the communication may be between two servers or two clients instead of a client and a server.

The first branch node 102 is coupled to the client 110 through the network 107 and communicates through the network 107 with subsequent packets 206 in a form of an Ethernet header, an IP header, e.g., a 5-tuple, and a payload. Similarly, the remote server 112 is coupled to the second branch node 104 through a network 109 of any suitable type to send and receive packets with the second branch node 104. The subsequent packets 206 in the sequence of packets from the client 110 to the remote server 112 have the same form as the start packet 106 of FIG. 1 with the same 5-tuple, including the same source address of the client 110 and the destination address of the remote server 112. As with the start packet 106, the subsequent packet 208 has an Ethernet header, IP header, and payload.

The first branch node 102 communicates with the second branch node 104 using the same secure tunnel that was established in FIG. 1 and which may include a secure session and any suitable secure tunneling protocol e.g., IPsec, TLS, or DTLS. Encapsulated packets that are forwarded by the first branch node 102 to the second branch node 104 are first encapsulated and then sent. The encapsulation includes an outer wrapper as an Ethernet address and an outer IP header. The Ethernet and IP header of the second packet of the subsequent packets 206 has been converted into a reduced form in this to metadata. The outer IP header and the metadata make up the overhead 214 of the encapsulated packet that is forwarded with the original payload 216 through the secure tunnel 122 to the second branch node 104. The outer IP header is the same as that of FIG. 1 and may include the flow identifier 220. Alternatively, the flow identifier 220 may be a part of the SDWAN header that is included in the metadata of the overhead 214. The metadata is not readily parsed by nodes on the path between the first branch node 102 and the second branch node 104.

The combination of an SD-WAN header and inner IP header into a metadata section may provide a significant reduction in overhead and eventually lead to a noticeable decrease in the size of each packet. The metadata may be compressed and encrypted in some examples. In doing so, the inner packet and the SD-WAN header are parsed to determine which fields are immutable and which fields are mutable. As used herein, immutable refers to fields for which the values change infrequently. Mutable refers to fields for which the values change frequently. In some embodiments, frequent change corresponds to a change with each subsequent packet and infrequent change corresponds to no change for the duration of a 5-tuple flow. The parameters of a particular 5-tuple flow may be determined to suit particular implementations. However, this use of immutable and mutable is not necessary. After parsing the fields, the immutable fields can be removed. The flow identifier 220, discussed above, may be used to connect packets of the same flow that therefore have the same immutable fields. The mutable fields are conveyed each time so that the changes in the values are known by the receiver.

The second packet of the subsequent packets 206 from the client 110 may be another packet of the sequence of packets of the flow that all share the same source IP address and the same destination IP address. The SD-WAN header, labeled as the outer IP address of the encapsulated packet 218 may include the flow identifier 220 to identify the second packet of the subsequent packets 206 as being a part of the sequence of packets. The second branch node 104 receives the flow identifier 220 and the reduced inner packet, having metadata and the original payload 216, and then recreates the header of the reduced packet based on the header of the start packet 106. In this way, the metadata need not include the entire header of the second packet and subsequent packets of the sequence of packets that was already sent with the start packet 106. The immutable fields may be removed and then recovered by the second branch node 104 using the header of the start packet 106. The same approach may also be used for packets from the remote server 112 to the client 110 in which a flow identifier 220 is associated with the sequence of packets and subsequent packets from the second branch node 104 to the first branch node 102 are sent with reduced overhead. By recovering all of the fields to the IP header of the second packet 208 to the remote server 112, the remote server 112 is able to communicate without any change in its operation and without any adjustment for the secure tunnel 122 or the flow identifiers 220.

An SD-WAN creates a tunnel that is transport-agnostic, application-aware, and supports centralized management and provisioning. An SD-WAN can be inserted into other types of networks and allow for gradual migration from the existing multiprotocol label switching (MPLS), dynamic multipoint VPN (DMVPN), and other networks to SD-WAN. Using the flow identifier approach described above, the inner packet may be divided into mutable and immutable fields. Some form of a cookie, label, flow-id, or a (source-port, destination-port) pair, referred to as a flow identifier herein, is then associated with the immutable fields. This cookie/label/flow-id/port-pair is communicated with the entire payload packet from an SD-WAN sender to an SD-WAN receiver at least once using a start packet. Once the remote receiver on each side has learned the mapping that is used by the sender and confirms that the mapping has been learned, then the sender encodes its flow identifier in the SDWAN-header and is able to skip some or all of the immutable fields of the inner packet in the traffic that is sent from through the SD-WAN as reduced packets.

FIG. 3 is a diagram of an Internet Protocol version 4 (IPv4) header 300 showing an example of a division into mutable and immutable fields. The immutable fields are immutable for the duration of the 5-tuple and are shown as hashed. The labels of the fields and their characteristics may vary for different types of packets and different protocol variations. For the duration of the 5-tuple, the source address, destination address, and protocol fields do not change. The values for the version, Header Length (HLen), Length fields also do not change. The Checksum field will be recalculated by the receiving node. After the first packet with the IPv4 header, the values for these fields do not need to be sent again and the fields can be removed. By contrast, the values of the Type of Service (TOS), Identifier, Flag, Offset, and Time to Live (TTL) fields may change with each packet and are included in each packet. These values may be combined, compressed, and otherwise reduced in size. The reduced number of fields may be sent as is or converted into a metadata portion of an encapsulated packet.

Figure 4:
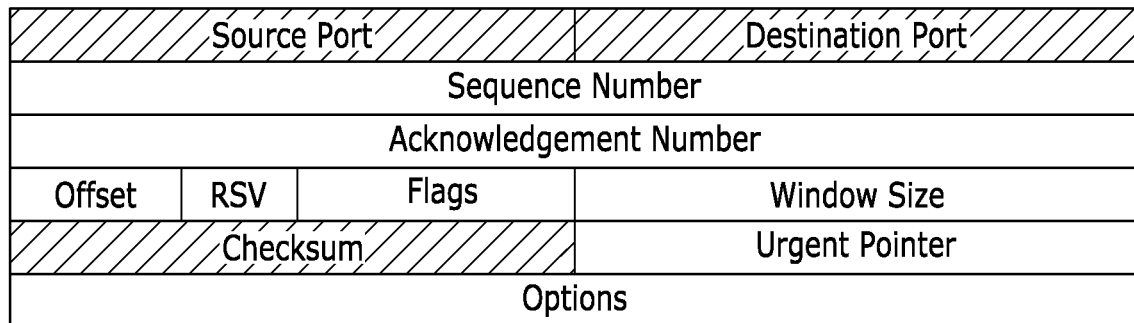
FIG. 4 is a diagram of a TCP header showing an example of a division into mutable and immutable fields suitable for embodiments herein.

FIG. 4 is a diagram of a transmission control protocol (TCP) header 400 that may be included in an IP packet and showing a division into mutable and immutable (shaded) fields. For the duration of the 5-tuple, the source port and destination port do not change. The Checksum field will be recalculated by the receiving node. By contrast the values of the sequence number, acknowledgment number, offset, reserved (RSV), flags, window size, and urgent pointer fields may change with some new packets and are included in each new packet. As mentioned above, these values may be combined, compressed, and otherwise reduced in size. The reduced size values may be included in a metadata portion of an encapsulated packet.

Figure 5:
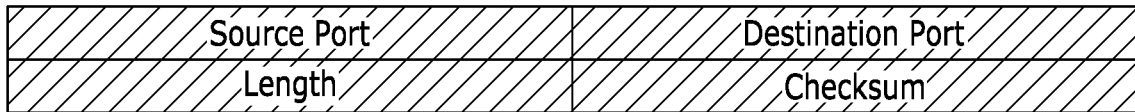
FIG. 5 is a diagram of a UDP header showing an example of a division into mutable and immutable fields suitable for embodiments herein.

FIG. 5 is a diagram of a user datagram protocol (UDP) header 500 that may be included in an IP packet and showing a division into mutable and immutable (shaded) fields. In the UDP header, all of the fields, source port, destination port, and length, are immutable and may be removed after the first packet.

Figure 6:
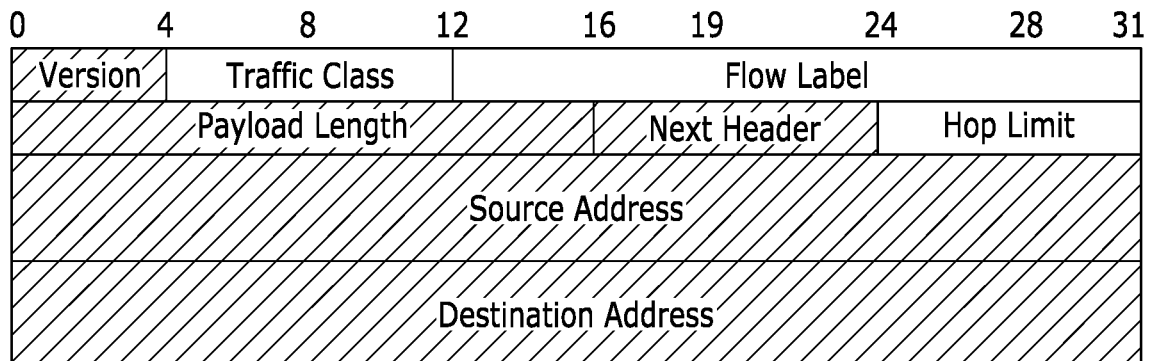
FIG. 6 is a diagram of an IPv6 header showing an example of a division into mutable and immutable fields suitable for embodiments herein.

FIG. 6 is a diagram of an Internet Protocol version 6 (IPv6) header 600 showing a division into mutable and immutable fields. The immutable fields are immutable for the duration of the 5-tuple and are shown as shaded. For the duration of the 5-tuple, the source address, destination address, payload length, next header and version fields do not change. After a start packet with an IPv6 header, these fields do not need to be sent again and can be removed. By contrast, the traffic class, flow label, and hop limit fields may change with each packet and are included in each packet in some form and may be compressed and may be rendered as metadata.

The structures of the above headers are provided as examples. Principles herein may be applied to other variations of these headers with changes to their configurations and also to different headers that have different fields. The division of fields may also be changed so that some fields shown as immutable may be treated as mutable and some fields shown as mutable may be treated as immutable. The structures are shown as example to illustrate the principles herein.

FIG. 7 is a diagram of how overhead may be reduced from 68 Bytes to 37 Bytes or less with a TCP packet tunneled through an SD-WAN in IPv4 in a Tunnel-less mode. A received packet 702 is in the form of a packet from a client to a hub and represents any packet, e.g., a TCP packet, in a sequence of packets as it might arrive from a client. A reduced packet 704 shows a header after fields have been removed from the header to form the reduced packet to send through a secure tunnel in the tunnel-less mode. The header of the received packet 702 includes an SD-WAN header 714 of 20 Bytes, an Encapsulating Security Payload (ESP) 716 of 8 Bytes, an IPv4 header 718 of 20 Bytes, and a TCP header 720 of 20 Bytes. The total header overhead for this packet is, accordingly, 68 Bytes. The flow identifier may be included in the SD-WAN header or in another field. The received packet also has a payload 712 that, for TCP, may vary in size with different packets. The size and components of the headers are provided as examples and apply in general to IPv4 TCP but other packet formats may be used instead.

The reduced packet 704 provides an example of how immutable fields may be removed from a packet header to form a reduced packet. The mutable fields are preserved but may be compressed and also encrypted. The removed fields are immutable for a particular flow, identified with a flow identifier, but will have different immutable values for other flows. Accordingly, the flow identifier of the SD-WAN header may be used to recover the values for the immutable fields from a different packet within the flow.

For the SD-WAN header 724 different fields may be removed depending on the amount of compression. The total size may be reduced using compression from 20 Bytes to 16 Bytes or less. This is described in more detail with respect to FIG. 14. For the ESP header 726 only the sequence number is mutable and is only 4 Bytes. For the IPv4 header only the type of service (TOS), time to live (TTL) and identifier fields are mutable and are only 4 Bytes. For the TCP header 730, only the sequence number, acknowledgement number, window size, urgent pointer, and flags are mutable and are only 13 Bytes. The payload 722 changes with each packet and is not removed or reduced. The total header overhead for the reduced packet is, accordingly, 37 Bytes, a reduction of 31 Bytes a 45% reduction. This reduction by removing immutable fields is referred to as low compression. By removing more immutable fields, a high compression to 34 Bytes may be obtained which is over 50%. In some examples, the reduced packet 704 is further compressed or encoded and the header or the header together with the payload is converted to a metadata supplement to form a more compact structure that requires still fewer bytes.

The example reduced packet 704 is for the example of an unfragmented IPv4 packet with a TCP header. TCP also allows for an incoming large packet to be fragmented into multiple small packets for transmission through the secure tunnel. The small packets are then re-assembled into a single large packet at the receiving node. The small packets are referred to as fragmented packets. For the fragmented packet, the header also has an offset, additional sequence number and a corresponding acknowledgment number. These fields are mutable and cause the header for a fragmented packet to be a little longer. The principles described herein may be applied to TCP and UDP packets and also to many other types of packets with headers to reduce overhead in many different communication contexts.

The reduction of overhead described above may be used to increase the amount of payload 722 without increasing the size of the reduced packet 704. In some examples, the payload may be increased or decreased without any affect on other aspects of the system. With transmission control protocol (TCP), a maximum segment size (MSS) is used to set the length of the payload. The MSS is exchanged in an initial TCP handshake. Upon determining that a low compression or a high compression may be applied to remove immutable fields, the sending node or SDWAN branch may increase the MSS value in the TCP header to allow for the payload to be increased. The payload may be increased enough to match the decrease in the overhead.

Some secure tunnel protocols may set particular header fields to be encrypted together with other header fields or with the payload. In order to remove immutable fields in a packet reduction mode, the first hub must first remove the immutable fields and then apply the encryption in a manner that is different from that set by the protocol. At the second hub, the encrypted value must first be restored and then the immutable fields added back in. This requires more processing power than processing each header field independently and it requires a modification of the protocol. In some examples, even immutable header fields may be transmitted in the packet reduction mode if those fields are encrypted with other header fields. Similarly, when immutable header fields are encrypted independent of other header fields or encrypted only with other immutable header fields, then these header fields may be removed in packet reduction mode without any significant impact on processing power and protocols.

Some secure tunnel protocols provide for transmission of an inner packet that is encapsulated in an outer header, but not encrypted. This configuration may be set in a capabilities exchange or other initiation or configuration process. Such a protocol may be suitable for a physically secure or private network or a network that uses a different security device, such as wireless signal scrambling, etc. When the inner packet is not encrypted, then many or all of the immutable fields may easily be removed by the transmitting node and then restored by the receiving node. When immutable fields of the inner packet header are encrypted with other fields or with payload, then it is more difficult to remove particular fields and more processing power may be required. This may cause an undesired extra delay or power demand on the SD-WAN.

Figure 8:
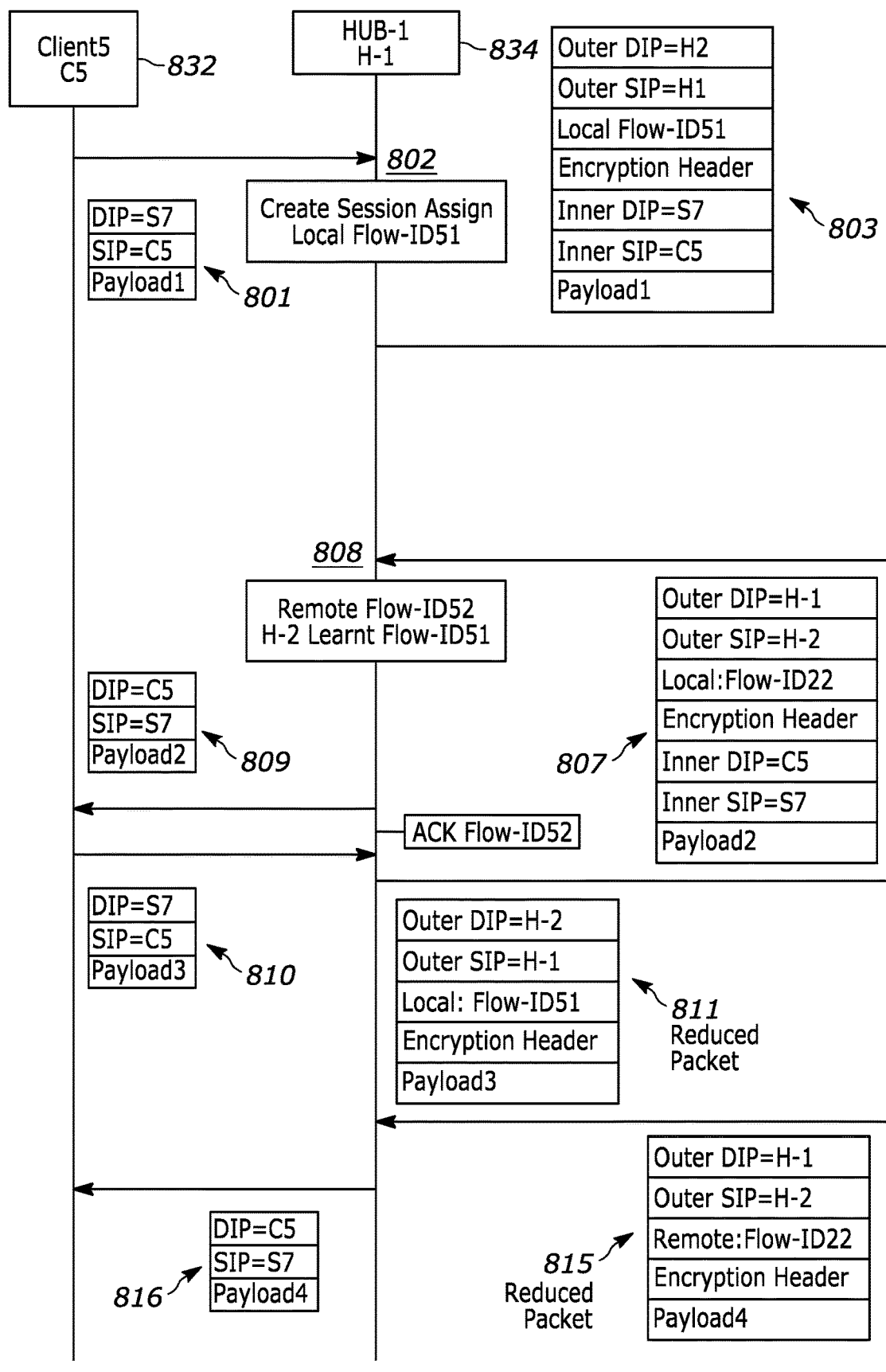
FIG. 8 is a block diagram of a client in communication with a remote server suitable for embodiments herein.
Figure 8:
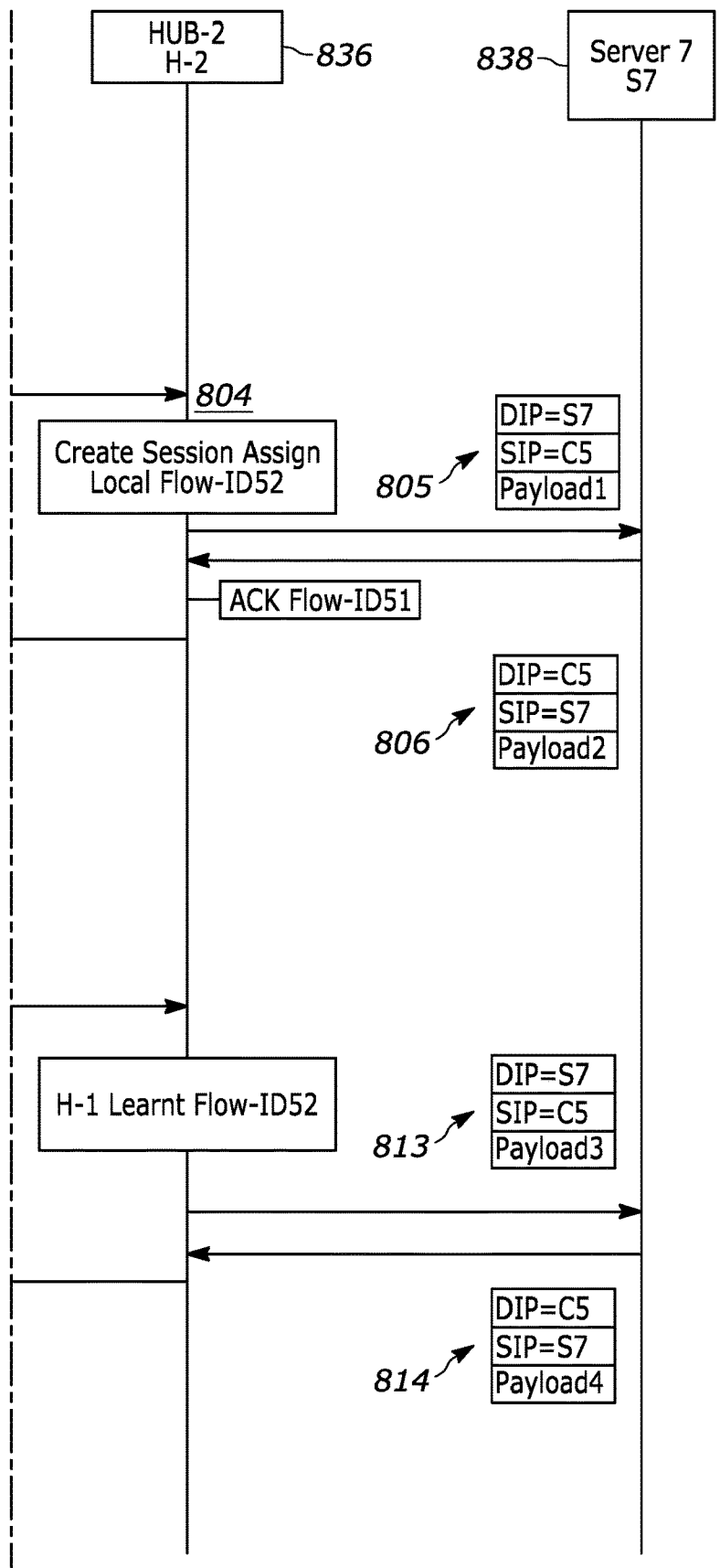

FIG. 8 is a block diagram of a client 832, Client 5 C5, in communication with a remote server 838, Server 7, S7. The communication runs through a first hub 834 that is coupled to a second hub 836 through a network connection. The hubs may be customer premises equipment (CPE) as an example of possible types of nodes, but other nodes may be used instead. The hubs may operate as branch nodes, gateways, or other types of components. The client 832 is coupled to the remote server 838 to receive connections and services hosted by the remote server 838. As in the example of FIG. 1, the client 832 may be replaced with a server. The remote server 838 may be replaced by a client such that the communication may be between two servers or two clients instead of a client and a server.

As an example, a first packet is a start packet 801 from the client has a header that includes a destination IP address, dest-IP, labeled here as DIP=Server 7, and a source IP address, src-IP, labeled here as SIP=Client5. The packet header may also include the rest of a 5-tuple and other information as discussed above. These other header elements are not shown in order to not unduly complicate the drawing figure. The start packet 801 also has a payload, labeled here as Payload1-C5-S7. The representation of the start packet 801 is to show that this packet is sent to Server7 from Client 5 and includes a payload, the first payload in the sequence. This packet will be treated as the start packet in this example; however, the start packet is not necessarily the first packet.

The start packet 801 is received at the first hub 834, e.g., a branch node, from the client 832. The first hub 834 performs a first sequence of operations 802. These operations include creating a session for packets from Client 5 to Server 7. The session establishes a secure tunnel between the two hubs so that data may be sent securely through an SD-WAN for which the path is not necessarily secure without the session. As mentioned above, the session may be for all packets with the same 5-tuple until the session times out for lack of a subsequent packet with the same 5-tuple. The first sequence of operations 802 includes assigning a local flow identifier, 51, for use with all packets in this session. The flow identifier is for use between the first hub 834 and the second hub 836 and is labeled as CPE1-To-CPE2 Flowid51. The flow identifier 51 is for use with packets from the first hub 834, SD-WAN CPE-1 to the second hub 836, SD-WAN CPE-2. For packets in the opposite direction, a second flow identifier, the remote flow identifier will be used. The remote flow identifier is not yet known.

The first sequence of operations is not a complete list of all of the operations that may be performed by the first hub 834. On receiving the start packet for a new 5-tuple flow, the first hub 834 may validate the packet, create the secure session for the packets sent from C5 to S7, choose and assign FlowId 51 for this flow and may also run all the rich Layer3-Layer7 services (e.g., Zero Trust Network Access (ZTNA), Unified Threat Management (UTM), Cloud Access Security Broker (CASB), Secure Web Gateway (SWG), Hierarchical Quality of Service (HQoS), etc.). Information relating to all these services may be sent to controllers (not shown) and to analytics (not shown).

Having performed the first sequence of operations 802, the first hub 834 sends an encapsulated packet 803 as a start packet to the second hub 836. The first hub 834 encrypts the packet received from C5 to S7, encodes its local flow identifier, 51, in the outer UDP-header, and sends the packet to the second hub 836 along the best underlay path for the application to which this packet belongs. The start packet is encapsulated with its own outer wrapper that will include its own 5-tuple for the path from the first hub 834 to the second hub 836. As shown, the outer wrapper includes an outer DIP=SDWAN CPE2, an outer SIP=SDWAN CPE1, and an encryption header for the session. The outer wrapper may also include port and protocol information among other information. In this example, the outer wrapper also includes the assigned flow ID 51. The encapsulated start packet 803 also includes the inner packet with the inner DIP=Server7, the inner SIP=Client5 and the payload, payload1. If the flow is a TCP flow, then in some examples, the first hub 834 adjusts the MSS to accommodate a larger payload in the next packet.

As shown, the other wrapper 5-tuple is not affected by the flow identifier, which means that the path of the encapsulated packet through the SD-WAN is not affected and any intermediate nodes are not affected. The outer DIP, outer SIP, protocol, outer source part, and outer destination port are not changed by the use of the flow identifier. There is no need to make any change to any intermediate nodes to ensure proper routing of the encapsulated packet. This allows the packet to traverse through nodes that are not owned, managed, or controlled in common with the hubs discussed herein.

When the encapsulated start packet 803 for the new 5-tuple flow arrives at the second hub 836, the second hub creates a session, saves the flow identifier, 51, that it received from the first hub 834 which the second hub 836 will use in future packets, decrypts and validates the packet, allocates and assigns its own flow identifier for this flow, and runs all the rich Layer3-Layer7 services (e.g., ZTNA, UTM, CASB, SWG, HQoS, etc.). Information relating to the services may be sent to a controller and to analytics. As shown, this includes a second sequence of operations 804 that are performed by the second hub 836. These operations include creating the session for packets from Client 5 to Server 7 and associating the session with FlowID 51 which is the remote flow identifier from the perspective of the second hub 836. In anticipation of a reply from the node of the DIP, Server 7, the second hub also assigns a local flow identifier, FlowID 22, for packets with the same 5-tuple from S7 to C5 until the session times out or ends in another way. This second flow identifier is for use from the second hub 836 to the first hub 834 and, accordingly, is labeled as CPE2-To-CPE1 Flowid22. The numbers 51 and 22 are provided as examples and any other suitable number in any base may be selected. Similarly, the designations of Client 5, Server7, CPE1, and CPE2 have no particular significance and are provided as examples. Any other suitable number or designation may be selected instead.

The second sequence of operations 804 relates to the communication of packets from the first hub 834 to the second hub 836. The created session for C5 to C7 is not for packets from the second hub 836 to the remote server 838, although a session may be created also for that path. The second hub decapsulates the encapsulated start packet 803 from the first hub and sends the decapsulated packet 805 to the destination, Server7. Like the start packet 801 from Client5, this packet has a single header with at least DIP=Server7, SIP=Client5, and Payload1. In decapsulating the encapsulated start packet 803, the second hub 836 parses, reads, and learns the inner packet header and especially the values for the immutable fields. These are then associated with flow identifier 51 and used with all of the packets from the first hub 834, SD-WAN CPE-1 to the second hub 836, SD-WAN CPE-2 and associated with the flow identifier 51.

At some time before or after receiving the decapsulated packet 805, the remote server 838 generates a packet to send to the client 832. The remote server 838 is coupled to the second hub 836 through a network or other connection of any suitable type to send and receive packets with the second hub 836. The packets may have a same or similar form as those from the client 832. This packet 805, has DIP=Client5, SIP=Server7 and Payload=Payload2. The packet 805 is sent from the remote server 838 to the second hub 836. The packets between the remote server 838 and the second hub 836 and the packets between the client 832 and the first hub 834 may be encrypted depending on the nature of the connections and the network. This encryption may be the same or different from that of the session between the first hub 834 and the second hub 836. In some embodiments, the second hub 836 decrypts the inner packet of the encapsulated start packet 803 received from the first hub 834 and forwards the packet 805 to the remote server 838 in a decapsulated and decrypted form.

On receiving the packet 806 from the remote server 838, the second hub 836 validates the packet 806, runs all the rich Layer3-Layer7 services (e.g., ZTNA, UTM, CASB, SWG, HQoS, etc.), encrypts the packet 806 as an inner packet of an encapsulated start packet 807, encodes its local flow identifier, 22, in an outer UDP-header, and sends the encapsulated start packet 807 to the first hub 834 along the best underlay path for the application to which this packet belongs. The second hub 836 also informs the first hub 834 that it has learned the flow identifier, 51, that the first hub 834 has allocated for this flow.

In particular, the second hub encapsulates the packet 806 with an outer wrapper that includes the second flow identifier 22 that was assigned by the second hub 836. The encapsulated start packet 807 is represented with an outer DIP=SDWAN CPE1, outer SIP=SDWAN CPE2, flowid22, inner DIP=Client5, inner SIP=Server7, payload2, and an encryption header. The encapsulated start packet 807 as with many of the other packets contains many other fields but these are not shown in order to simplify the presentation of the figure. As shown, the second encapsulated start packet 807 is the first packet through the SD-WAN in the return direction and contains the complete inner packet and the return direction flow identifier. The indication that the first flow identifier, 51, has been learned at the second hub 836 may be implicit or explicit in the second encapsulated start packet or communicated in another way. If the flow is a TCP flow, then in some examples, the first hub 834 adjusts the MSS to accommodate a larger payload in the next packet.

Upon receiving the new start packet from the remote server 838 at the first hub 834 from the second hub 836, the first hub performs a third sequence of operations 808. The first operation is to log that the session between the first hub 834 and the second hub 836 has been successfully created using the local flow identifier 51 and the second hub 836 has learned the local flow identifier, 51. The first hub also receives the second flow identifier, 22, for the return path. The first hub 834 updates the session state with the fact that the second hub 836 has learned about its local flow identifier, 51, and is ready to receive packets that are encoded with the local flow identifier.

As described above with respect to the start packet 801, the first hub 834 is coupled to the client 832 through a network or other means and communicates through the network with packets in a form of an Ethernet header or other network protocol, and an IP header, e.g., a 5-tuple, and a payload. The first hub 834 decapsulates the encapsulated start packet 807 after it is received and after performing any other suitable services on the decrypted packet 809, sends the decrypted packet 809 to the destination IP address, Client 5, through the network with the tunnel header removed, i.e., decapsulated and decrypted. The packet 809 to the client 832 has DIP=Client5, SIP=Server7, and payload2 with no indication of the session, header, and flow identifier between the first hub 834 and the second hub 836.

At another time, after receiving the packet 809 from the remote server 838, the client 832 generates another packet 810 to send to the remote server 838. The packet 810 has the same 5-tuple as the start packet 801 to the remote server 838 and will typically have a different payload, labeled as payload3. This packet is, accordingly, part of the sequence of packets from the client to the server each having a same flow. In some example, having the same flow is defined as having the same 5-tuple, or as having the same source address and destination address. After receiving the packet 810 with payload3 from the client 832 and addressed to the remote server 838, the first hub 834 validates and runs through all the suitable services. It creates a new payload which only has the mutable fields of a packet from Client5 to Server7 with Payload3. The first hub 834 encrypts this payload, encodes its local flow identifier, 51, in the outer UDP header, and sends the packet as part of an encapsulated reduced packet 811 to the second hub 836 along the best underlay path for the application to which this packet belongs. The first hub 834 also informs the second hub 836 that it has learned the remote flow identifier, 22, that the second hub 836 has allocated for this flow.

The first hub is now able to use the flow identifier, 51, to reduce the overhead through the secure tunnel between the first hub 834 and the second hub 836. This is indicated by the structure of the encapsulated reduced packet 811. In this encapsulated reduced packet 811, the outer wrapper is the same as for the previous packet and initial packet, the encapsulated start packet 803, with the outer DIP, and outer SIP to transit the encapsulated reduced packet 811 through the tunnel from the first hub 834 to the second hub 836. The flow identifier, 51, is included to indicate that this packet is part of the sequence of packets with the same 5-tuple or other identifiers and the same immutable fields. The inner wrapper, and other immutable parts of the outer wrapper are removed and simply identified by the flow identifier, 51. As a result, the encapsulated reduced packet 811 is shown as having only an encryption header and the payload, payload3.

In some protocols, a packet has a header parameter that specifies the size of the payload. As an example, Maximum Segment Size (MSS) is a parameter in a TCP header which specifies the maximum data a device can receive in a single TCP segment. An initial value for the MSS parameter will be exchanged in the TCP handshake (SYN, SYN-ACK, ACK) before the exchange of FIG. 8 or in the encapsulated start packet 803. In a packet reduction mode, the packet header is compressed allowing for more room for data. This makes it possible to send more data in a packet that has the same total size as compared to the encapsulated start packet 803. The first hub may intercept the TCP packet and increase the value of the MSS parameter in the TCP header of the encapsulated reduced packet 811.

Since we are compressing the header, we will have room for more data, the hosts can send more data in a single segment when compared to a tunneled scenario When the encapsulated reduced packet 811 arrives at the second hub 836, the second hub 836 performs any suitable services on the encapsulated reduced packet 811. It updates the session state with the fact that the first hub 834 has learned about the remote flow identifier, 22, and is ready to receive more reduced packets in the sequence of packets that are encoded with flow identifier 22.

The second hub 836, performs a fourth sequence of operations 812. These operations are similar to the operations of the third sequence of operations 808. The first is to log that the session between the second hub 836 and the first hub 834 has been successfully created using the remote flow identifier, 22, and the first hub 834 has learned the remote flow identifier, 22. The second hub 836 receives the first flow identifier, 51, for the outbound path and uses the header information with the values for the immutable fields and prepares the inner packet of the received encapsulated reduced packet 811 to send to the destination IP address at the remote server 838. As shown, the decapsulated, decrypted inner packet 813 to the remote server 838 has the DIP=Server7 and SIP=Client5 even though this information was not included with the encapsulated reduced packet 811. The second hub 836 is able to reconstruct the inner packet header, including the complete 5-tuple and other fields, based on information associated with the flow identifier, 51, that it has preserved from the earlier packet.

The values of the mutable fields of the packet 810 may be encrypted in a metadata portion (not shown) of the encapsulated reduced packet 811. The values of the immutable fields of the packet 810 may be removed and not included in the encapsulated reduced packet 811. The encryption level may be selected based on available bandwidth and quality of the path through the SD-WAN. As an example, when there is a low bandwidth link, and the processing power at the hubs is limited, then a medium level of encryption may be used. For a still lower bandwidth link or when there is ample processing power for encryption and decryption, a higher encryption level may be used.

The reduction of the overhead data in the inner packet is shown also on the return path. The remote server 838, in this example, generates a second packet 814 to send to the client 832. The second packet 814 has DIP=Client5, SIP=Server7, and a new payload, payload4, so that it is a packet of a sequence of packets from the remote server 838 to the client 832. This second packet 814 is received at the second hub 836 which then prepares the packet to transit through the secure tunnel to the first hub 834. The second hub 836 validates and runs through all suitable services. Next it creates a new payload which only has the mutable fields of the second packet 814 received from the remote server 838 with payload4. The second hub 836 encrypts this payload, encodes its local flow identifier, 22, in the outer UDP-header, and sends the encapsulated reduced packet 815 to the first hub 834 along the best underlay path for the application to which this packet belongs.

The encapsulated reduced packet 815 from the second hub, like the encapsulated reduced packet 811 from the first hub, is reduced in that it does not include the inner packet header but only the flow identifier, 22, for the return path. Values for mutable fields of the inner packet header are combined into a metadata or payload part of the inner packet. The encapsulated reduced packet 815 has an outer DIP=SDWAN CPE1, an outer SIP=SDWAN CPE2, flow identifier 22, an encryption header and payload4.

Using the outer wrapper with the outer DIP and outer SIP, the encapsulated reduced packet 815 is transmitted through the SD-WAN to the first hub 834. The first hub 834 uses the flow identifier, 22, to retrieve the immutable field values including the DIP and SIP of the inner packet header. The first hub 834 may retrieve a full 5-tuple for the inner packet and also values of other fields. The first hub then decapsulates the received encapsulated reduced packet 815 and generates a full packet 816 to send to the client 832. This full packet 816 includes the DIP=Client5, SIP=Server7 which were not included in the encapsulated reduced packet 815 that was received from the second hub 836. It also includes the payload, payload4 that was included in the received encapsulated reduced packet 815.

The described approach using flow identifiers does not necessarily invalidate the use of sequence numbers or any particular sequence numbers of received packets, nor does it necessarily add any metadata to Transmission Control Protocol-Synchronize (TCP SYN) packets, which might not be acceptable to firewalls and transit devices. As a result, TCP packets do not have to be transformed into UDP packets, but may be sent through the SD-WAN as UDP packets. Network address traversal (NAT) devices and firewalls in the underlay transport networks are not affected by the use of the flow identifiers because the outer wrapper is not changed. Keep-alive packets are not required for individual user sessions because Network Address Traversal (NAT) sessions do not need to expire. The use of the flow identifier through a secure tunnel may be enabled or disabled at will between any two sites or nodes without affecting the session or the paths. In addition, using the SD-WAN header, the parameters of the reduced packets may be adjusted. This includes the level of compression, enabling and disabling the packet reduction mode, and using or choosing different policies.

Figure 9:
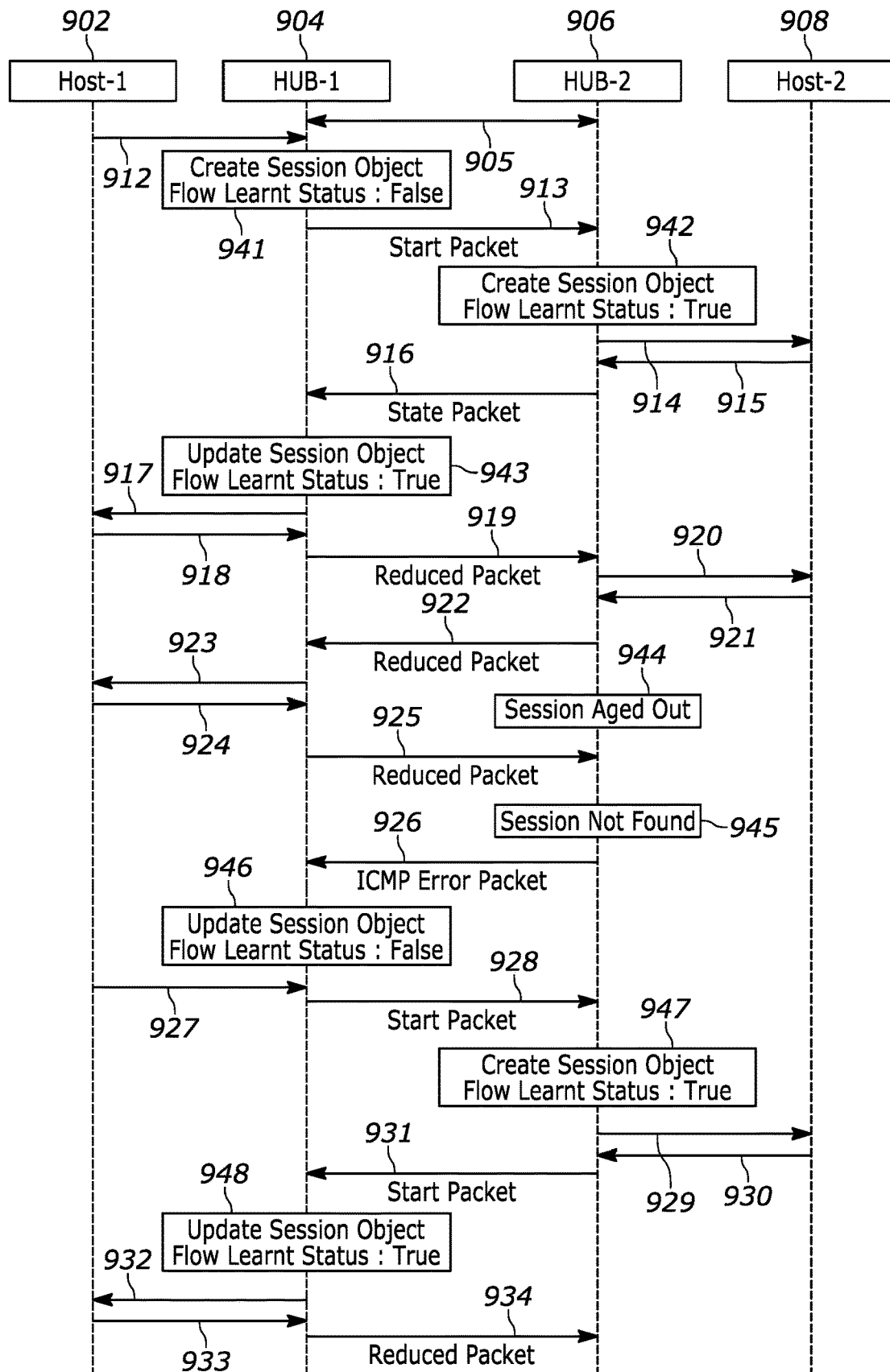
FIG. 9 is a sequence diagram of recovering a session when communicating packets through an SD-WAN with a flow identifier suitable for embodiments herein.

FIG. 9 is a sequence diagram of recovering a session when communicating packets through an SD-WAN with a flow identifier. The components as in the previous examples are a first host 902 connected through a network or direct connection to a first hub 904 connected through an SD-WAN 905 to a second hub 906, connected through a network or direct connection to a second host 908. The hosts may be individual user clients, internet of things (IoT) devices, servers, or any other type of device. The first and second hub may be any suitable network node, hub, branch, or gateway to an SD-WAN.

A packet is generated by the first host 902 and sent 912 from the first host 902 to the first hub 904. The packet has a 5-tuple for which the SIP is the first host and the DIP is the second host 908. After the first hub receives the packet, it parses the 5-tuple and determines a suitable path through the SD-WAN 905 to the second hub 906 on the way to the second host 908. At 941, the first hub 904 creates a session for the path and a session object for the flow of packets with this 5-tuple. The session object includes the flow identifier and the immutable fields of the packet. The flow learnt status for the session starts as false.

A start packet is sent at 913 from the first hub 904 to the second hub 906 through the SD-WAN 905. This is a regular SD-WAN packet with the exception that the start packet includes a local flow identifier from the first hub 904. The second hub receives the start packet, decapsulates, decrypts and forwards 914 the inner packet of the start packet to the second host 908.

In the illustrated packet exchange, the second host 908 replies 915 with a packet to the first host 902. This packet is received through the second hub 906 which parses the 5-tuple and creates its own session object with its own local flow identifier. The second host encapsulates and sends 916 the encapsulated reply start packet from the second host with a wrapper that includes its assigned local flow identifier and includes an indication that it has learned the remote flow identifier, the flow identifier assigned by the first hub 904. This reply start packet appears as a regular SD-WAN packet to any intermediate nodes or routers in the path. It differs in that it includes in its header the new flow identifier and confirmation of learning the first flow identifier.

When the reply start packet arrives at the first hub, the first hub is able to update its session object with the flow learnt status as true. The session for the sequence of packets from the first host 902 to the second host 908 is now fully established. The first hub 904 also sends 917 the inner packet, decapsulated and decrypted, to the first host 902. When a second packet is sent 918 from the first host to the second host 908, the first hub 904 is able to use the established session and flow identifier to send 919 reduced packets through the SD-WAN using the flow identifier.

The encapsulated reduced packet is received at the second hub and then forwarded 920 to the second host. Similarly, a second packet sent 921 from the second host is forwarded 922 as an encapsulated reduced packet with the flow identifier from the second host through the second hub to the first hub. The first hub then forwards 923 the inner packet to the first host 902. Packets in a sequence of packets and a reply sequence of packets may be exchanged in this way as reduced packets and reduced reply packets using flow identifiers with reduced overhead through many packet exchanges to suit any particular application or communication as may be desired by the first host and the second host.

At some later time, the session fails at 944. In this example, the session has timed out. However, the session may fail for any other reason including a restart of any one of the nodes that are participating in the session. There may be an error for a different reason such as an error with the first hub, with the second hub, with the path between the first hub and the second hub, or a policy violation. An error message, e.g., an Internet Control Message Protocol (ICMP) message may be sent indicating that the session has timed out. An ICMP message may include an error code and may indicate that the session has aged, that the second hub has restarted, that the second hub did not find the flow identifier or another error.

After this failure 944, a next packet that is sent 924 from the first host and forwarded 925 as an encapsulated reduced packet by the first hub reaches the second hub but is not forwarded to the second host 908. If the first hub, the second hub, or the path 905 has failed, then the packet that is sent 924 by the first host will not make it securely to the second hub 906 or the second host, depending on the error. If an encapsulated reduced packet is received at the second hub, but the second hub is not able to find the session object, for the included flow identifier then there will be an error. The second hub will not be able to recreate the inner packet to send to the second host. An error packet is returned 926 to the first hub 904 to indicate that the packet has not been forwarded and, in some embodiments, to provide a reason using an error code or another technique.

In some embodiments, the error packet would initiate an ICMP error message with a specific flow id error code and the flow id to indicate to the sender that a complete packet should be sent. The flow id may be included in the data section of the ICMP message. Alternatively, a different type of error message may be used. A unique flow id error code for the particular flow indicates to the first hub 904 that the problem affects the identified flow. The error message is configured to indicate an error with a flow of the sequence of packets associated with the flow identifier. This flow is from the first hub to the second hub through the secure tunnel. The first hub may then infer that the solution is to start over with the earlier flow for the same 5-tuple pair by facilitating the first secure tunnel again and re-assigning the second flow identifier.

In response to the error packet, the first hub 904 updates the status of the session that there is an error. Using session objects, the flow learnt status is updated as false for the session object. When a new packet is sent 927 from the first hub 904, The first hub starts over with the process as described with respect to a start packet that is sent at 913 at the top of the sequence diagram because there is no session and no session object linked to a flow identifier. The new packet is sent 927 from the first host 902 encapsulated as a start packet by the first hub with a standard SD-WAN packet with a new flow identifier and then sent 928 to the second hub 906. In this case, the second hub that receives the start packet may be the same or different from the earlier second hub and may be connected on the same or a different path.

The second hub 906 creates a session object with the new flow identifier at 947 in response to receiving the start packet with the flow identifier. A flow learnt status for the newly created session object is set to true for the flow identifier from the first hub 904. This is the remote flow identifier from the perspective of the second hub 906.

When the second host 908 now sends 930 another or a subsequent packet then the subsequent packet is also sent 931 from the second hub 906 to the first hub 904 through the SD-WAN 905 as a start packet, except that it has a local flow identifier from the second hub 906 and an indication that the local flow identifier from the first hub has been learned. The first hub at 948 updates the session object for its local flow identifier as true and sends 932 the decapsulated, decrypted packet to the first host.

Communication is now able to continue using the flow identifiers and reduced packets. This is indicated with the first host sending 933 a packet in the sequence of packets to the first host and the first host then, after removing immutable fields, encrypting mutable fields and the payload, and encapsulating the packet, sending 934 a reduced packet through the SD-WAN 905 using the flow identifier as described above.

In some embodiments a hub or other node may use a variant of Connectivity Fault Management/Y.1731 (CFM: IEEE 802.1ag) to monitor all the possible paths to other hubs with which the hub needs to communicate directly. For this purpose, a path is from the transport address on one hub to a transport address on another hub. The hub or other node may build a database of information about possible paths over various access circuits. The information may include latency, jitter, packet loss, and roundtrip delay to other SD-WAN sites.

The detail of the 5-tuples for the outer addresses and the inner addresses may be maintained in a memory at the hub, branch, or gateway. The 5-tuple details may be mapped to the corresponding tunnel session. This map may be maintained in a database in a memory of the hub.

The flow identifier approach applied here may be applied to any secure tunnel including to a virtual private network (VPN). In a typical VPN protocol, the client communicates through the VPN tunnel using the outer wrapper 5-tuple. When Network Address Translation (NAT) is used, the hub removes the client tunnel IP address and replaces it with a routable gateway IP address before forwarding the inner packet to the corresponding remote server using the destination IP address of the packet received from the client. The remote server responds to the routable gateway IP address and does not see the client IP address. The gateway receives packets from the remote server and replaces the routable gateway IP address with the client tunnel IP address before encapsulating the inner packet for tunneling back to the client. The client does not see the routable gateway IP address except when the gateway using the same address for the VPN session with the client. By providing, the tunnel IP address to the client in a reply, the client is able to request that the tunnel IP address be made consistent across VPN sessions.

Figure 10:
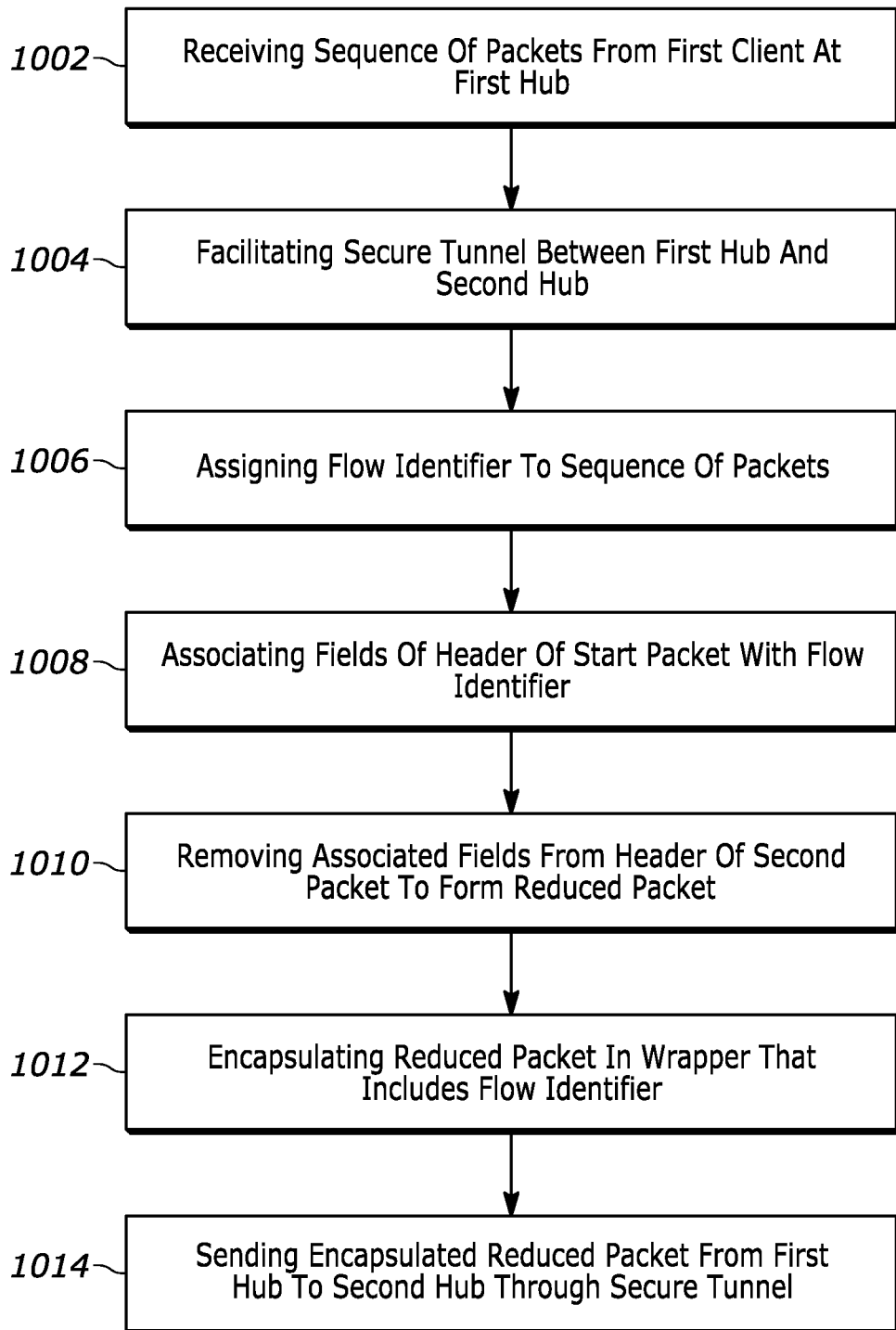
FIG. 10 is a process flow diagram of routing traffic from a first hub to a second hub using a flow identifier and a reduced packet suitable for embodiments herein.

FIG. 10 is a process flow diagram of routing traffic through a software-defined wide area network (SD-WAN) between a first hub and a second hub using flow identifiers. The process starts at 1002 with receiving a sequence of packets from a first client at the first hub, the sequence of packets each of a same flow. At 1004, the first hub performs facilitating a secure tunnel between the first hub and the second hub. The secure tunnel may include a session between the first hub and the second hub.

The method continues with assigning a flow identifier to the sequence of packets at 1006 and associating fields of a header of a start packet of the sequence of packets with the flow identifier at 1008. A capabilities exchange may be performed between the first hub and the second hub for the flow identifier before removing any associated fields. The capabilities exchange determining whether both hubs support a reduced packet mode. The capabilities exchange may also include choosing policies, enabling, or disabling use of the flow identifier and determining compression and encryption parameters. In examples, the start packet of the sequence of packets is encapsulated in a wrapper that includes the flow identifier. The header of the encapsulated start packet includes the associated fields and the encapsulated start packet is sent from the first hub to the second hub through the secure tunnel.

The process is prepared to operate in the tunnel-less mode. An acknowledgement of the flow identifier from the second hub may be received and the first hub may update a state of the session with the acknowledgement. At 1010 removing the associated fields from a header of a second packet of the sequence of packets is performed to form a reduced packet. In some examples, the fields that are the same in the sequence of packets are removed. These are referred to herein as immutable fields. In some examples, the fields of the second packet header are converted to a header format that has fewer bytes. In some examples, the fields of the second packet header are converted to a metadata supplement to the reduced packet. At 1012 encapsulating the reduced packet in a wrapper that includes the flow identifier is performed. At 1014 sending the encapsulated reduced packet of the sequence of packets from the first hub to the second hub through the secure tunnel is performed.

In some examples, the first hub further receives a second flow identifier from the second hub through the secure tunnel and receives reply encapsulated packets directed to the source address of the received sequence of packets. The second flow identifier may be included within a wrapper of the reply encapsulated packets. The first hub may save the second flow identifier and use the second flow identifier to identify subsequent reply encapsulated packets received from the second hub. The receiving may include receiving a reply start packet, and subsequent packets. The first hub decapsulates the reply encapsulated packets, recreates headers of the decapsulated reply encapsulated packets based on a header received with the reply start packet, and forwards the decapsulated reply packets to the source address of the sequence of packets.

Figure 11:
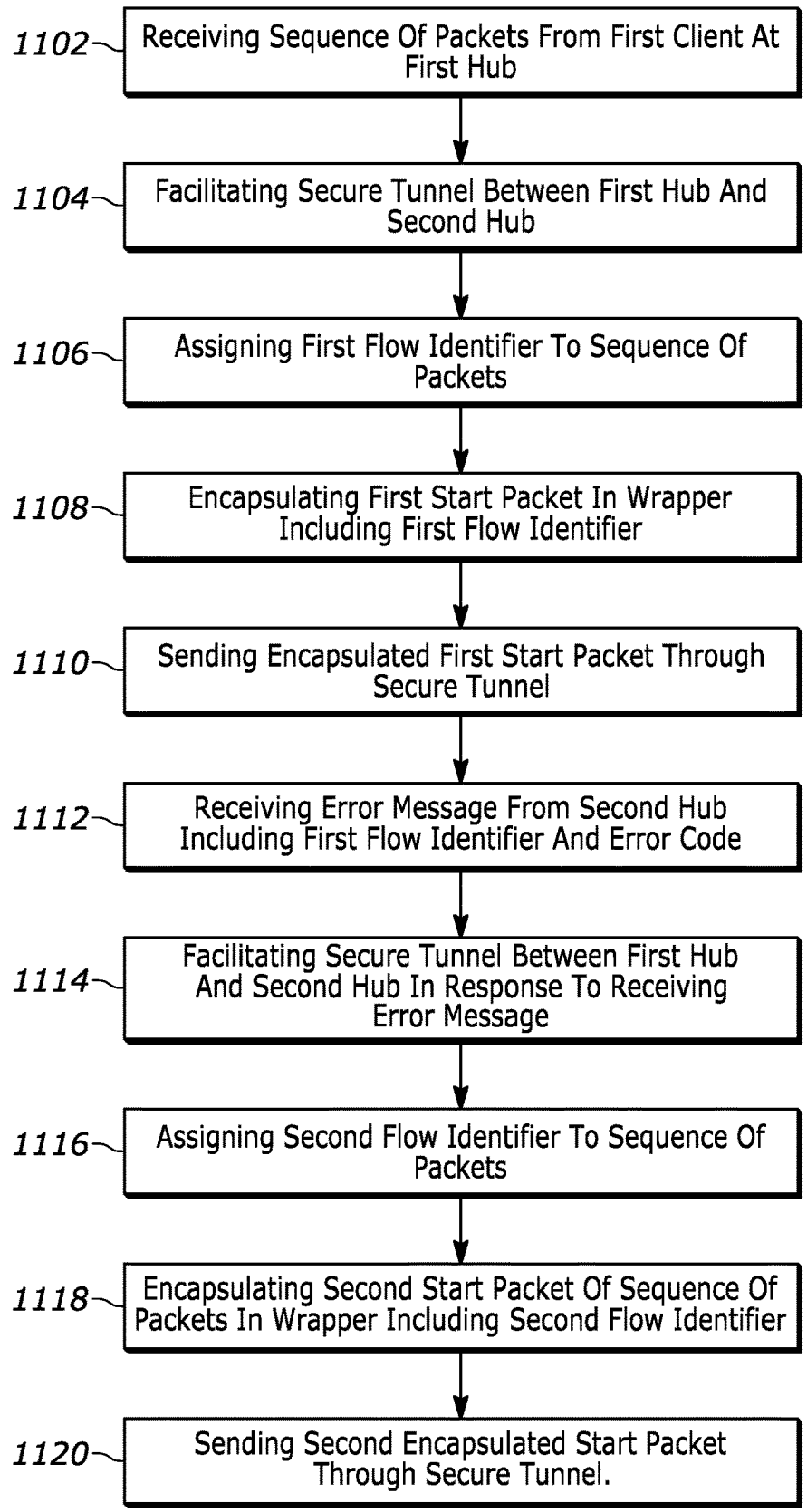
FIG. 11 is a process flow diagram of facilitating a second secure tunnel in response to an error message including a flow identifier suitable for embodiments herein.

FIG. 11 is an alternative process flow diagram of routing traffic through a software-defined wide area network (SD-WAN) between a first hub and a second hub using flow identifiers. The process starts at 1102 with receiving a sequence of packets from a first client at the first hub, the sequence of packets each of a same flow. At 1104, facilitating a first secure tunnel between the first hub and the second hub is performed.

At 1106, assigning a first flow identifier to the sequence of packets of a flow is performed and encapsulating a first start packet of the sequence of packets in a wrapper, the wrapper including the first flow identifier is performed at 1108. The encapsulated packets may have a full start packet of the sequence of packets and then be followed with reduced packets identified with the flow identifier. The packets may be reduced by encryption, by removing immutable fields, also referred to as compression, or both. Even when the subsequent packets are not reduced, the flow identifier may be used for traffic engineering. Traffic engineering considers the flow identifier when routing packets to use a consistent path, application processing service or other facility of a network.

With the tunnel and flow identifier established, sending the encapsulated start packet of the sequence of packets from the first hub to the second hub through the first secure tunnel is performed at 1110.

At 1112, the process continues with receiving an error message from the second hub, the error message including the first flow identifier and an error code. In examples, the error message may be configured to indicate an error with a flow of the sequence of packets associated with the flow identifier, or to indicate that a session associated with the first secure tunnel has aged, or to indicate that the second hub has restarted, or to indicate that the second hub did not find the flow identifier. The error message may be configured as an ICMP message with an error code. The error code may be selected to indicate the nature of the error including any of the above examples of errors.

In response to receiving the error message, facilitating the secure tunnel again between the first hub and the second hub is performed at 1114. The secure tunnel has been lost due to the error indicated in the error message. Using the flow identifier included in the error message, the first hub is able to identify the sequence of packets that was affected by the error. The first secure tunnel may be re-established. In some embodiments, a second secure tunnel may be established that replaces the first secure tunnel. Facilitating the secure tunnel may include establishing a session between the first hub and the second hub. At 1116, assigning a second flow identifier to the sequence of packets of the same flow is performed. The first flow identifier relates to packets of the flow that were sent through the secure tunnel before the error message. One or more of these packets may have been lost due to the error. The same flow identifier or a second flow identifier is assigned to the later packets of the same flow to be sent after the error messages was received. The second flow identifier, if used, may exclude those packets that were already successfully received by the second hub. In some circumstances, the entire sequence of packets may be sent through the tunnel with the second flow identifier.

At 1118, encapsulating a second packet of the sequence of packets in a wrapper, the wrapper including the flow identifier is performed and at 1120, sending the encapsulated reduced packet of the sequence of packets from the first hub to the second hub through the secure tunnel is performed. In some examples, a new start packet is sent with the second flow identifier through the secure tunnel. Subsequent packets of the flow after the start packet may also be identified with the second flow identifier and may be reduced by removing immutable fields or in another way as compared to the second start packet. The error message and the secure tunnel and flow identifiers allow the benefits of the flow identifier to be resumed even after an error in the packet flow.

In some embodiments, the process may be described as a process between two nodes, B1 and B2 that facilitate a communications channel between two endpoints. A first node, B1, is sending tunnel-less traffic to a second node, B2, with flow identifier F1. Then, in B2, the session is cleared for some reason. B2 will send an ICMP error with the flow identifier F1 in the ICMP payload. Upon receiving the ICMP message, B1 clears the flow learnt hint and starts sending uncompressed packets with the same or a new flow identifier. After receiving one or more uncompressed packets, B2 sends a response that it has learnt the new flow identifier. B1 then starts sending compressed, e.g., tunnel-less packets. The traffic may still go through the same tunnel as before the session was cleared.

Figure 12:
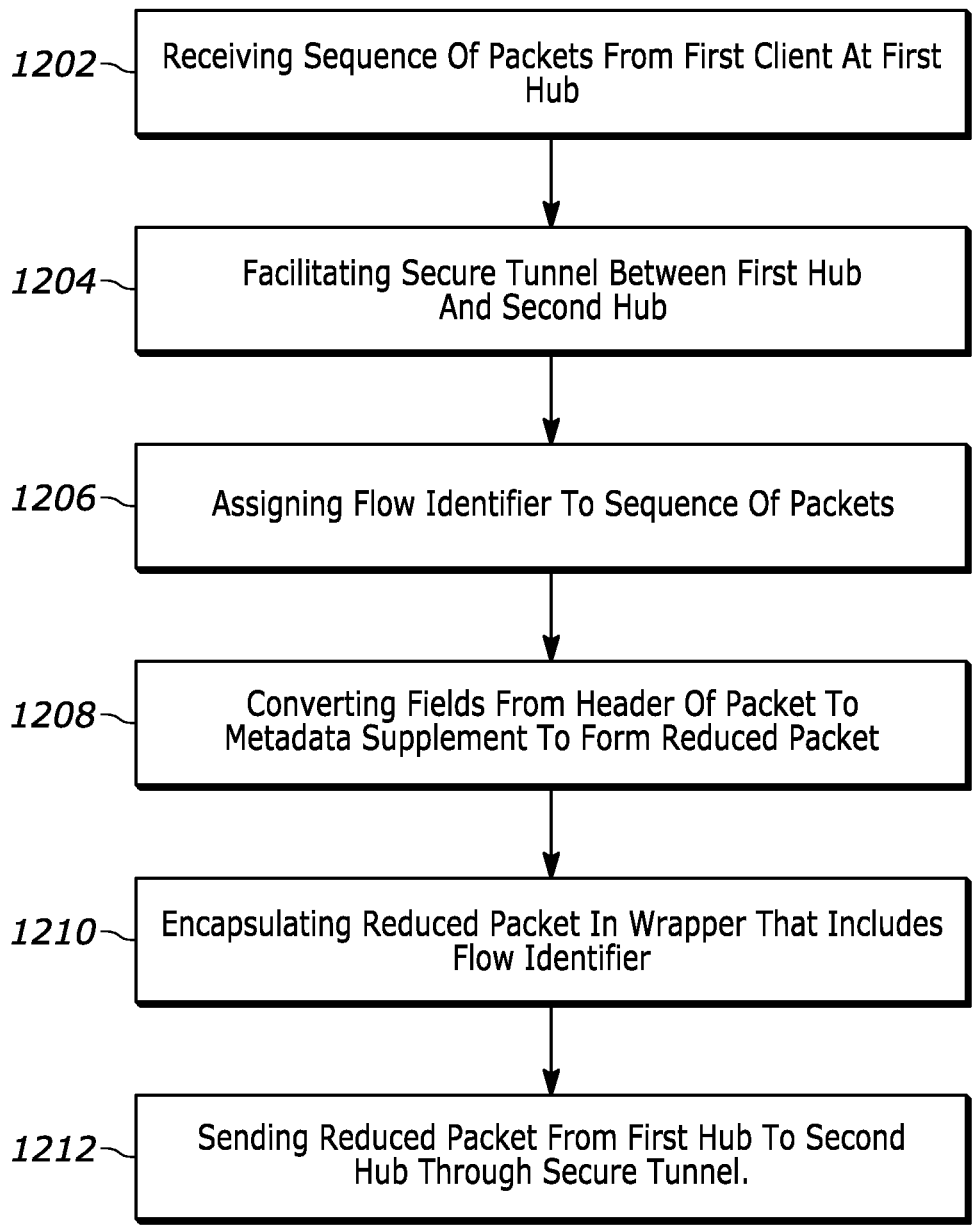
FIG. 12 is a process flow diagram of converting fields from a header to a metadata supplement for packets from a first hub to a second hub using a flow identifier suitable for embodiments herein.

FIG. 12 is a further alternative process flow diagram of routing traffic through a software-defined wide area network (SD-WAN) between a first hub and a second hub using flow identifiers. At 1202, the process performs receiving a sequence of packets from a first client at the first hub, the sequence of packets each of a same flow.

At 1204, facilitating a secure tunnel between the first hub and the second hub is performed and at 1206 assigning a flow identifier to the sequence of packets is performed. The secure tunnel may be part of a session in the SD-WAN. A packet reduction mode may be associated with the flow identifier.

The packet reduction mode may include a compression level that is configured to indicate an amount that the fields of the packet header are removed in the metadata supplement. In some examples the compression level may be LO, MED, or HI. In some examples, different types of compression may be used. The packet reduction mode may include an encryption level configured to indicate an amount of encryption applied to the fields in the metadata supplement. The encryption amount may include encryption or no encryption. A capabilities exchange between the first hub and the second hub may be performed for a flow identifier and also for determining the packet reduction mode.

At 1208, converting fields from a header of the packet to a metadata supplement to the packet to form a reduced packet is performed. Converting fields may include removing the header of the packet, combining the header and the flow identifier to form metadata, and attaching the metadata to a payload of the reduced packet before encapsulation. The converting the fields may be done in accordance with a packet reduction mode that is associated with the flow identifier.

At 1210, encapsulating the reduced packet in a wrapper that includes the flow identifier is performed and at 1212, sending the packet of the sequence of packets from the first hub to the second hub through the secure tunnel is performed.

In some examples, establishing the secure tunnel includes establishing a session and the process includes encapsulating a start packet of the sequence of packets in a wrapper that includes the flow identifier and the header of the encapsulated start packet. Sending the encapsulated start packet from the first hub to the second hub through the secure tunnel is performed. After the start packet is successfully received by the second hub, then receiving an acknowledgement of the flow identifier from the second hub and updating a state of the session with the acknowledgement is performed.

In some examples, the process includes receiving a second flow identifier from the second hub through the secure tunnel, saving the second flow identifier, and receiving reply encapsulated packets directed to the source address of the received sequence of packets. The first hub may then use the second flow identifier to identify subsequent reply encapsulated packets received from the second hub.

Using the flow identifier, the first hub may decapsulate the reply encapsulated packets, recreating headers of the decapsulated reply encapsulated packets based on metadata supplements of the decapsulated reply packets and a packet reduction mode associated with the second flow identifier, and forward the decapsulated reply packets to the source address of the sequence of packets.

In some embodiments, the first hub receives an error message from the second hub including the flow identifier. The first hub facilitates a second secure tunnel between the first hub and the second hub in response to receiving the error message, assigns a second flow identifier to the sequence of packets, encapsulating a second packet of the sequence of packets in a wrapper, that includes the second flow identifier, and sends the encapsulated reduced packet of the sequence of packets from the first hub to the second hub through the second secure tunnel.

Figure 13:
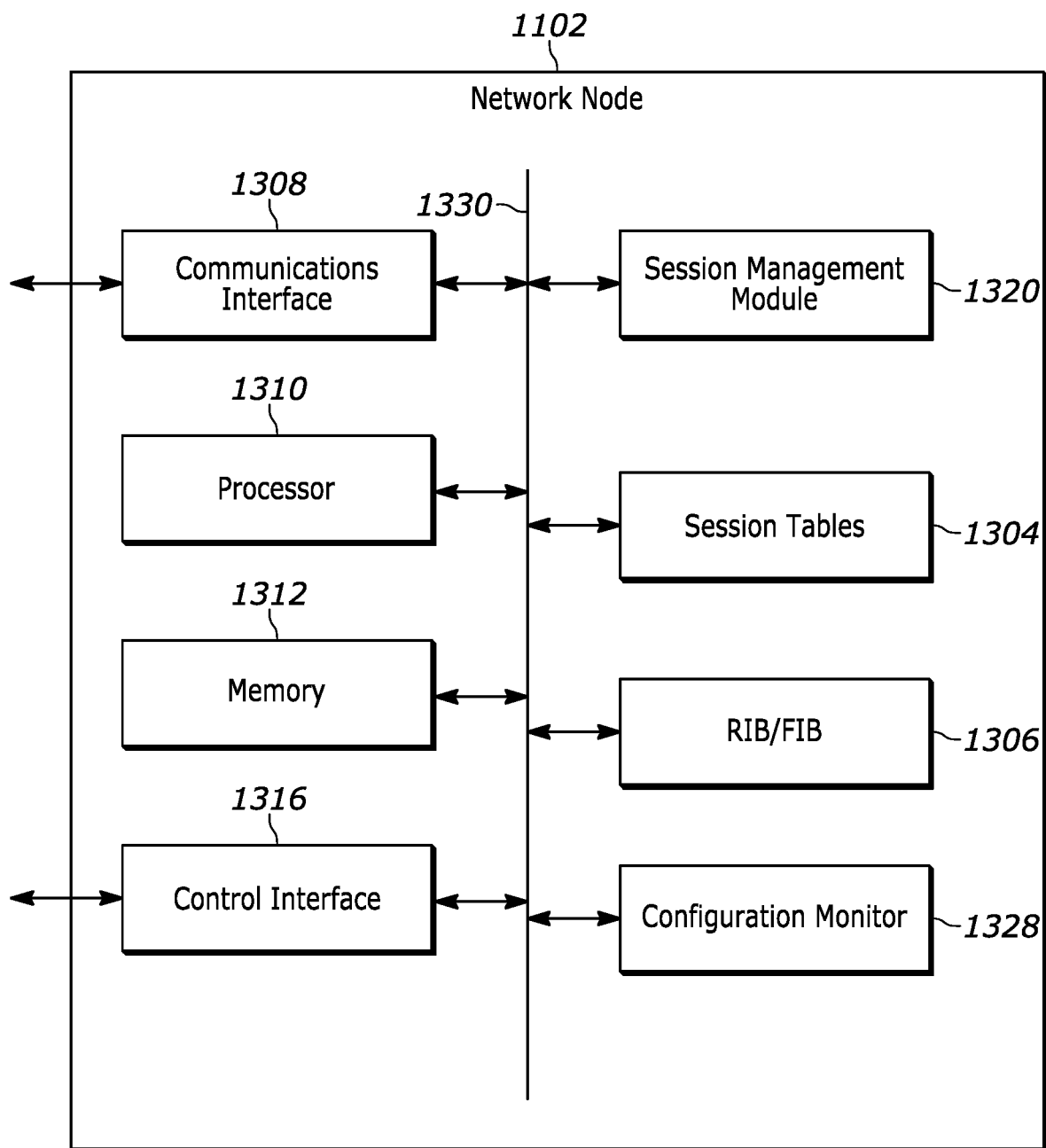
FIG. 13 is a block diagram of an apparatus, such as a node, that communicates as a client, gateway, or remote server suitable for embodiments herein.

FIG. 13 is a block diagram of an apparatus, such as a node 1302 or hub that communicates as a client, hub, branch, gateway, or server as described herein. The node may be a gateway, a source branch, a destination branch, an edge node, or a hub node, or another network node according to embodiments herein. The node includes a communications interface 1308, a processor 1310, and a memory 1312 connected together through a bus 1330. The processor 1310 may include a multifunction processor and/or an application-specific processor. The memory 1312 within the node may include, volatile and non-volatile memory for example, a non-transitory storage medium such as read only memory (ROM), flash memory, Random Access Memory (RAM), and a large capacity permanent storage device such as a hard disk drive.

The communications interface 1308 enables data communications with authentication, secure tunnels, SLA metrics, route exchange, capability exchange, session establishment, etc., via local and wide area connections using one or more different protocols including Ethernet, IPsec, TLS, DTLS, Multiprotocol Border gateway Protocol (MP-BGP), VXLAN, Multi-Protocol Label Switching (MPLS), etc. The node 1302 executes computer readable instructions stored in the storage medium of the memory 1312 to implement various tasks as described herein. The node 1302 further includes a routing table manager with a routing information base/forwarding information base (RIB/FIB) 1306 and various other traffic caches (e.g., application cache, domain application cache, client route cache, and application route cache) to store mapping information and other traffic communication data coupled to the bus 1330. The computer in the form of the node 1302 executes computer readable instructions stored in the storage medium to implement various tasks as described above.

A control interface 1316 may be provided for node management and configuration purposes as an interface to a computer monitor or flat panel display but may include any output device. In addition, the control interface 1316 may include an interface to a computer keyboard and/or pointing device such as a computer mouse, computer track pad, touch screen, etc., that allows a user to provide inputs and receive outputs including a GUI (graphical user interface). A GUI can be responsive to user inputs and typically displays images and data. The control interface 1316 can be provided as a web page served via a communication to a remote device for display to a user and for receiving inputs from the user. Additionally, each of the modules may be implemented through instructions stored on a non-transitory computer-readable storage medium. The computer-readable instructions, e.g., program instructions, are executed on a physical processor of a computing system that supports the node to cause the computer to perform the operations described herein, among others.

The node 1302 includes a configuration monitor 1328 to monitor policy input including secure tunnel protocols, network interface state updates, and remote monitor updates, among others. The configuration monitor 1328 generates alerts or interrupts and updates backup status when there are changes to any of the monitored network node states, and configurations. The configuration monitor 1328 may also maintain a routing information base/forwarding information base (RIB/FIB) 1306.

The node further includes session tables 1304 and a session management module (SWIM) 1320 to monitor any sessions that are established by the node or with the node through a secure tunnel, VPN, or other connection. The session tables may include session object states, flow identifiers, immutable field values, and other values. The session tables may be updated in response to error messages, flow identifiers from other hubs, and the start or end of a sequence of packets using the same 5-tuple. In embodiments, the session management module includes a secure tunnel or VPN client. Another session management module may be coupled to web clients that are operated by the processor 1310.

Figure 14:
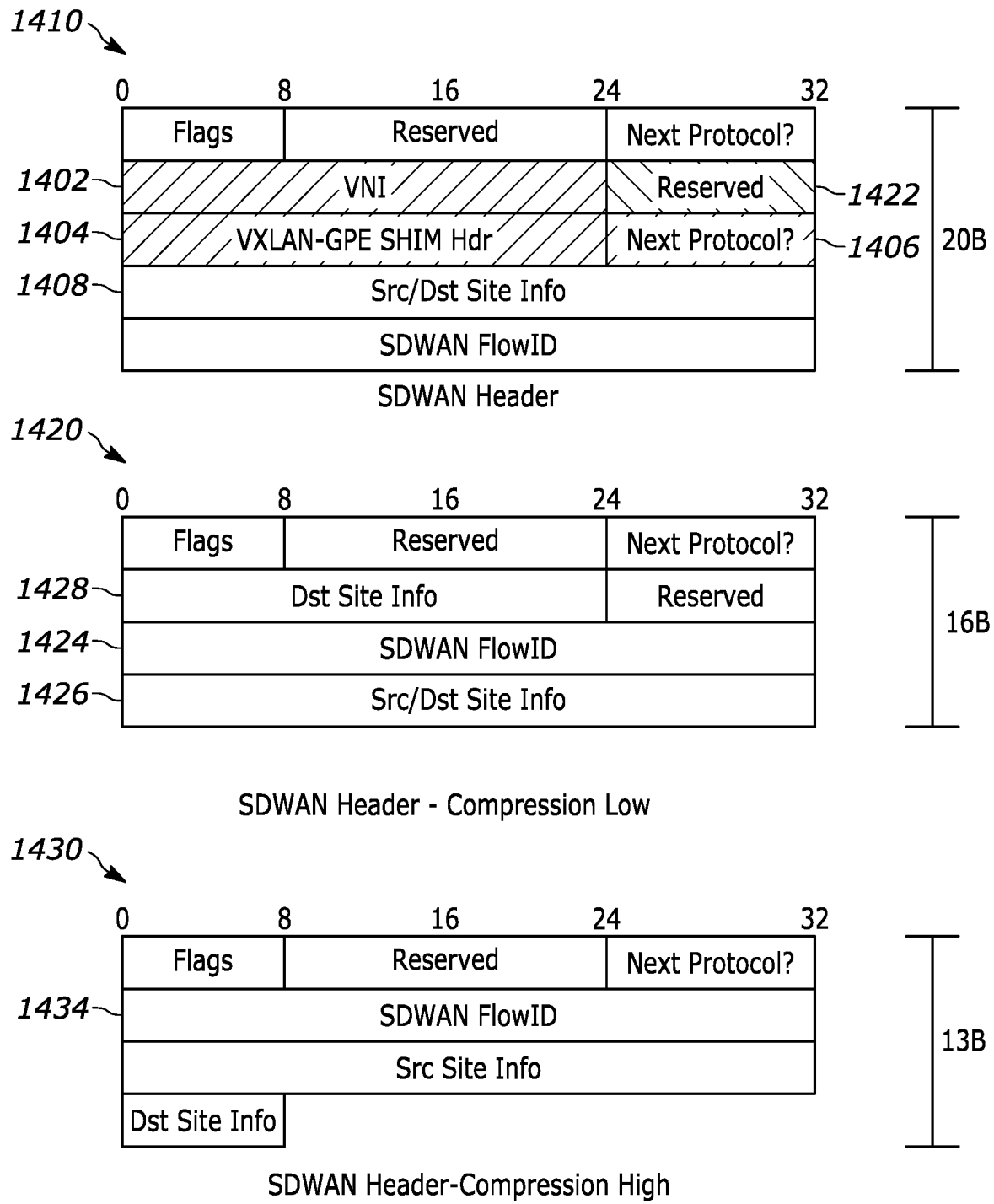
FIG. 14 is a diagram of an SD-WAN header showing mutable and immutable fields with a low and a high compression example suitable for embodiments herein

FIG. 14 is a diagram of a received SD-WAN header 1410 showing mutable and immutable fields with a low compression example and a high compression example. The SD-WAN header may be the same as or similar to the SD-WAN header of the received packet 702 of FIG. 7. The SD-WAN header 710 includes mutable fields and immutable fields indicated by shading. The particular configuration of the SD-WAN header is provided as an example only and more, fewer, or different fields may be used and in different configurations. As indicated at the left, the fields total 20 Bytes. The fields include Flags, Reserved, Next Protocol, Virtual Network Instance (VNI) 1402, Reserved 1422, Virtual Local Area Network-Generic Protocol Extension (VXLAN-GPE) shim header 1404, Next Protocol 1406, Source/Destination Site Information 1408, and SD-WAN Flow Identifier. As shown four of these header fields are immutable.

The second SD-WAN header 1420 shows an example of low compression, in that some but not all of the immutable fields are removed. The header may be further encrypted or combined with other header data and payload and then encrypted as described in more detail above. The reduced packet mode may be configured for low compression or high compression or any other parameters based on a capabilities exchange or any other handshake between the hubs or nodes that are communicating through a secure tunnel. In this low compression example for a second SD-WAN header 1420, the immutable fields, VNI 1402, VXLAN-GPE shim header 1404 and Next Protocol 1406 are deleted. This reduces the header by 4 Bytes from 20 Bytes to 16 Bytes. The Source/Destination Site Info 1408 has been reconfigured as Destination Site Info 1428 and Source Site Info 1426 but this does not reduce the total size of the overhead. The SDWAN Flow Identifier 1424 remains in the second SD-WAN header so that the immutable fields may be recovered by reference to a previously received packet with the same SDWAN Flow Identifier.

The third SD-WAN header 1430 shows an example of high compression in that another Next Protocol field 1406 has been removed taking another 3 Bytes from the SD-WAN header 1430 as compared to the received SD-WAN header 1410. The SDWAN Flow Identifier 1434 also remains in the third SD-WAN header for the recovery of the immutable fields. The sizes of the three different SD-WAN headers 20 Bytes, 16 Bytes, 13 Bytes, correspond to the dimensions provided in FIG. 7.

The embodiments disclosed herein can be implemented through at least one software program running on at least one hardware device and performing network communication functions to connect through secure tunnels and with remote servers.

It is understood that the scope of the protection for systems and methods disclosed herein is extended to such a program and in addition to a computer readable storage medium having a message therein, to such a computer readable storage medium containing program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method to route traffic through a software-defined wide area network (SD-WAN) between a first hub and a second hub, the method comprising:

receiving a sequence of packets from a first client at the first hub, the sequence of packets each having a same flow;

facilitating a secure tunnel between the first hub and the second hub;

assigning a first flow identifier to the sequence of packets of the flow;

encapsulating a first start packet of the sequence of packets in a wrapper, the wrapper including the first flow identifier;

sending the encapsulated first start packet of the sequence of packets from the first hub to the second hub through the secure tunnel;

receiving an error message from the second hub, the error message including the first flow identifier and an error code;

facilitating the secure tunnel again between the first hub and the second hub in response to receiving the error message;

assigning a second flow identifier to the sequence of packets;

encapsulating a second start packet of the sequence of packets in a wrapper, the wrapper including the second flow identifier; and sending the encapsulated second start packet of the sequence of packets from the first hub to the second hub through the secure tunnel;

further comprising:

converting fields of a header of a third packet of the sequence of packets to a header format that has fewer bytes to form a reduced third packet;

encapsulating the reduced third packet in a wrapper that includes the second flow identifier; and sending the encapsulated reduced third packet from the first hub to the second hub through the secure tunnel.

2. The method of claim 1, wherein the error message is configured to indicate an error with a flow of the sequence of packets associated with the first flow identifier.

3. The method of claim 1, wherein the error code is configured to indicate that a session associated with the secure tunnel has aged.

4. The method of claim 1, wherein the error code is configured to indicate that the second hub has restarted.

5. The method of claim 1, wherein the error code is configured to indicate that the second hub did not find the first flow identifier.

6. The method of claim 1, wherein the error message is configured as an Internet Control Message Protocol (ICMP) message.

7. The method of claim 1, wherein converting fields comprises converting the fields of the reduced third packet to a metadata supplement to the reduced third packet.

8. The method of claim 1, wherein converting fields comprises removing the second start packet header and combining the second start packet header and the second flow identifier to form metadata attached to a payload of the reduced third packet before encapsulating the reduced third packet.

9. The method of claim 1, further comprising:
converting fields of a header of a fourth packet of the sequence of packets to a header format that has fewer bytes to form a reduced fourth packet;
encapsulating the reduced fourth packet in a wrapper that includes the second flow identifier; and
sending the encapsulated reduced fourth packet of the sequence of packets from the first hub to the second hub through the secure tunnel.

10. A non-transitory computer-readable storage medium containing program instructions, which when executed by the computer cause the computer to perform operations comprising:
receiving a sequence of packets from a first client at a first hub, the sequence of packets each having a same flow;
facilitating a secure tunnel between the first hub and a second hub;
assigning a first flow identifier to the sequence of packets having the flow;
encapsulating a start packet of the sequence of packets in a wrapper, the wrapper including the first flow identifier;
sending the encapsulated start packet of the sequence of packets from the first hub to the second hub through the secure tunnel;
receiving an error message from the second hub, the error message including the first flow identifier and an error code;
facilitating a second secure tunnel between the first hub and the second hub in response to receiving the error message;
assigning a second flow identifier to the sequence of packets;
encapsulating a second start packet of the sequence of packets in a wrapper, the wrapper including the second flow identifier; and
sending the encapsulated second start packet of the sequence of packets from the first hub to the second hub through the second secure tunnel;
the operations further comprising:
associating fields of a header of the second start packet with the second flow identifier;
removing the associated fields from a header of a third packet of the sequence of packets to form a reduced third packet; and
encapsulating the reduced third packet in a wrapper that includes the second flow identifier; and
sending the encapsulated reduced third packet of the sequence of packets from the first hub to the second hub through the second secure tunnel,
wherein sending the encapsulated second start packet comprises sending the encapsulated second start packet without removing fields from a header of the second start packet.

11. The medium of claim 10, wherein the error message is configured to indicate an error with a flow of the sequence of packets associated with the first flow identifier.

12. The medium of claim 10, wherein the error code is configured to indicate that the second hub did not find the first flow identifier.

13. The medium of claim 10, wherein the error message is configured as an Internet Control Message Protocol (ICMP) message.

14. A network node comprising:
a processor and memory configured to;
receive a sequence of packets from a first client, the sequence of packets each having a same flow;
facilitate a secure tunnel between the network node and a hub and to assign a first flow identifier to the sequence of packets; and
encapsulate a first start packet of the sequence of packets in a wrapper, the wrapper including the first flow identifier;
send the encapsulated first start packet of the sequence of packets from the network node to the hub through the secure tunnel, and to receive an error message from the hub, the error message including the first flow identifier and an error code;
facilitate a second secure tunnel between the network node and the hub in response to receiving the error message and to assign a second flow identifier to the sequence of packets;
encapsulate a second start packet of the sequence of packets in a wrapper, the wrapper including the second flow identifier;
send the encapsulated second start packet of the sequence of packets from the network node to the hub through the second secure tunnel;
convert fields of a header of a third packet of the sequence of packets to a header format that has fewer bytes to form a reduced third packet and to encapsulate the reduced third packet in a wrapper that includes the second flow identifier; and
send the encapsulated reduced third packet from the network node to the hub through the second secure tunnel,
wherein sending the encapsulated second start packet comprises sending the encapsulated second start packet without removing fields from a header of the second start packet.

15. The network node of claim 14, wherein converting fields comprises converting the fields of the reduced packet to a metadata supplement to the reduced packet.

16. The network node of claim 14, wherein the sequence of packets each having a same flow each have a same 5-tuple.

* * * * *